US011799882B1

(12) United States Patent
Ghosh et al.

(10) Patent No.: US 11,799,882 B1
(45) Date of Patent: Oct. 24, 2023

(54) NETWORK ENDPOINT IDENTIFICATION THROUGH NETWORK FINGERPRINT BASED ENTITY RESOLUTION

(71) Applicant: Arista Networks, Inc., Santa Clara, CA (US)

(72) Inventors: Arunabh Ghosh, San Jose, CA (US); Debabrata Dash, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/825,130

(22) Filed: May 26, 2022

(51) Int. Cl.
*H04L 9/32* (2006.01)
*H04L 12/26* (2006.01)
*H04L 29/06* (2006.01)
*H04L 29/08* (2006.01)
*H04L 9/40* (2022.01)
*H04L 67/289* (2022.01)
*G06F 16/9538* (2019.01)
*G06F 16/215* (2019.01)
*H04L 43/04* (2022.01)

(52) U.S. Cl.
CPC ........ *H04L 63/1416* (2013.01); *G06F 16/215* (2019.01); *G06F 16/9538* (2019.01); *H04L 9/32* (2013.01); *H04L 43/04* (2013.01); *H04L 67/289* (2013.01)

(58) Field of Classification Search
CPC .... G06F 16/00; G06F 16/215; G06F 16/9538; G06F 16/3247; H04L 9/00; H04L 9/32; H04L 9/3247; H04L 9/40; H04L 63/00; H04L 63/10; H04L 63/14–1416
See application file for complete search history.

(56) References Cited

U.S. PATENT DOCUMENTS

| | | | |
|---|---|---|---|
| 9,268,763 B1* | 2/2016 | Esho | G06F 40/143 |
| 10,972,461 B2* | 4/2021 | Lackey | H04L 63/1425 |
| 2006/0047962 A1* | 3/2006 | Adams | H04L 63/0823 |
| | | | 713/175 |
| 2015/0150110 A1* | 5/2015 | Canning | H04L 63/0807 |
| | | | 726/9 |
| 2021/0200867 A1* | 7/2021 | Schmugar | G06F 21/572 |

* cited by examiner

*Primary Examiner* — Boris D Grijalva Lobos
(74) *Attorney, Agent, or Firm* — Fountainhead Law Group P.C.

(57) ABSTRACT

A method and system for network endpoint identification through network fingerprint based entity resolution. Particularly, embodiments disclosed herein may entail receiving a network fingerprint descriptive of at least a network endpoint; obtaining at least two network endpoint label sets each inferred from the network fingerprint by a different network fingerprint parser; reducing, through entity resolution and heuristics, the at least two network endpoint label sets into a de-duplicated network endpoint label set; and resolving, through a voting algorithm, the de-duplicated network endpoint label set to obtain a unified network endpoint label that best identifies the network endpoint.

19 Claims, 22 Drawing Sheets

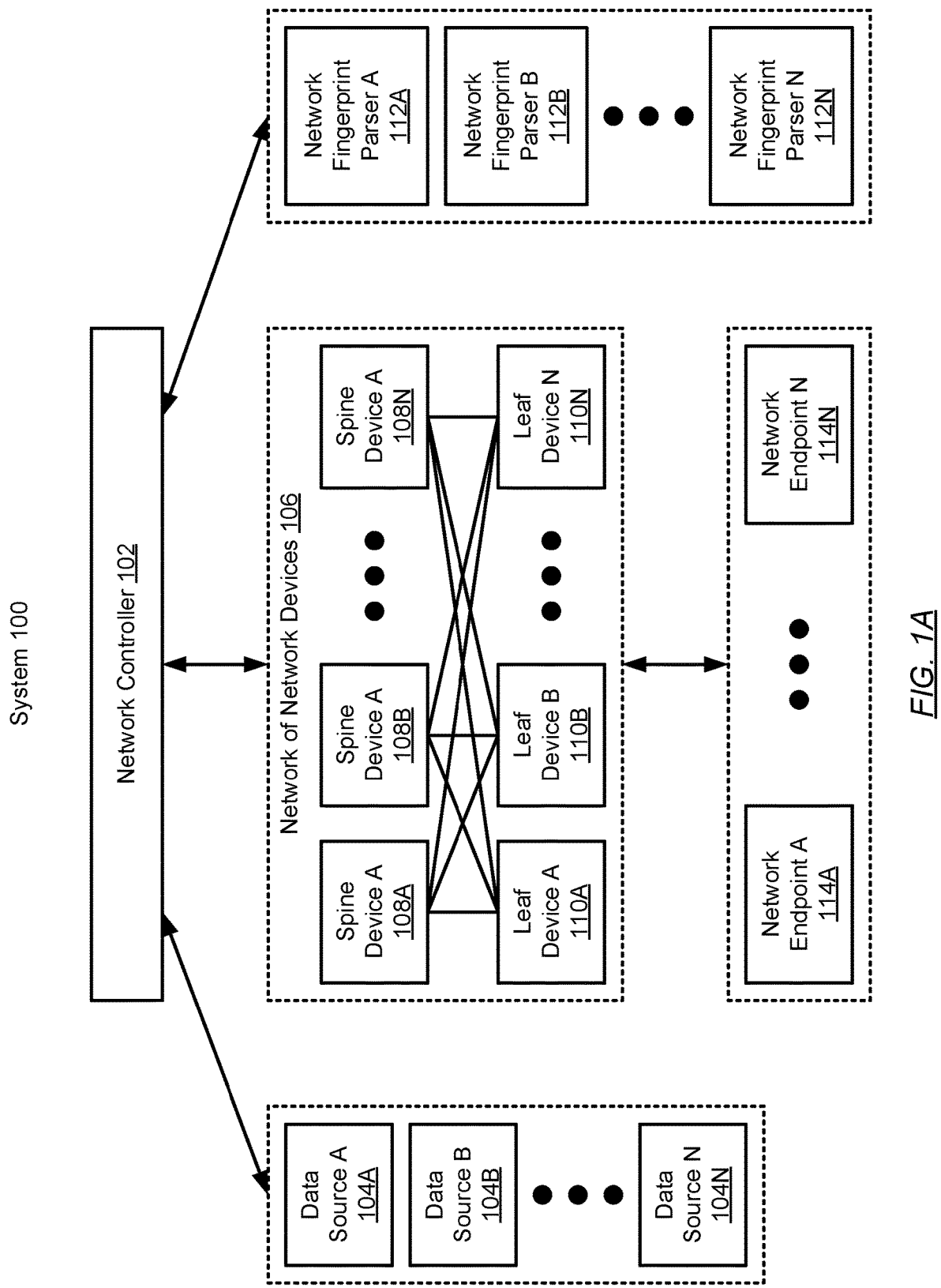

NETWORK ENDPOINT IDENTIFICATION THROUGH NETWORK FINGERPRINT BASED ENTITY RESOLUTION

BACKGROUND

Within the context(s) of computing and/or networking, a fingerprint, or a digital fingerprint, may refer to a unique digital identifier derived from various information. Further, depending on the various information collected or extracted, a digital fingerprint may be used to uniquely identify a network protocol, an operating system, a hardware device, software, and/or a user, among other entities.

BRIEF DESCRIPTION OF DRAWINGS

FIG. 1A shows a system in accordance with one or more embodiments disclosed herein.

DETAILED DESCRIPTION

Figure 1B:
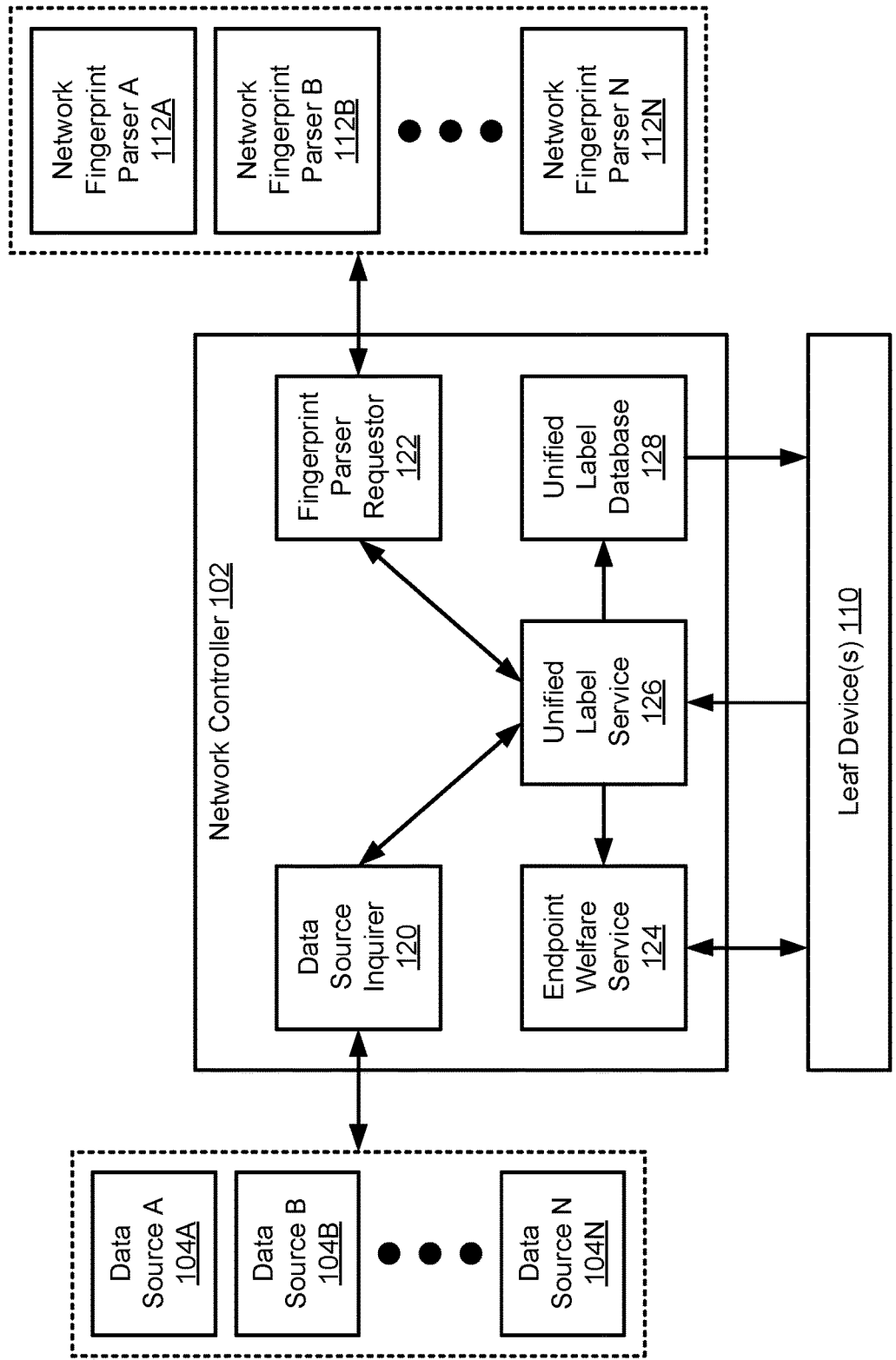
FIG. 1B shows a network controller in accordance with one or more embodiments disclosed herein.

Specific embodiments disclosed herein will now be described in detail with reference to the accompanying figures.

In general, embodiments disclosed herein relate to network endpoint identification through network fingerprint based entity resolution. Particularly, embodiments disclosed herein may entail receiving a network fingerprint descriptive of at least a network endpoint; obtaining at least two network endpoint label sets each inferred from the network fingerprint by a different network fingerprint parser; reducing, through entity resolution and heuristics, the at least two network endpoint label sets into a de-duplicated network endpoint label set; and resolving, through a voting algorithm, the de-duplicated network endpoint label set to obtain a unified network endpoint label that best identifies the network endpoint.

Within the context(s) of computing and/or networking, a fingerprint, or a digital fingerprint, may refer to a unique digital identifier derived from various information. Further, depending on the various information collected or extracted, a digital fingerprint may be used to uniquely identify a network protocol, an operating system, a hardware device, software, and/or a user, among other entities. A network fingerprint, for example, may entail a characteristic identification string that may identify a given software agent on a given hardware device (e.g., a network endpoint) that may operate through a given network protocol.

Network fingerprints, moreover, are often formatted using different schema depending on the given software agent and the given network protocol. Accordingly, each schema may label the given hardware device differently. Merging these varying hardware device labels, into a unified hardware device label (or type) for the given hardware device, is presently performed through a cumbersome manual process entailing entity resolution. Entity resolution, in turn, may generally reference the challenge of identifying records across two or more datasets, from two or more sources (e.g., network fingerprint parsers), respectively, that reference the same entity. When applied to network fingerprints, entity resolution works to select a unified hardware device label from the varying hardware device labels extracted from varying network fingerprint schema.

In addressing the shortfalls of manually merging varying labels, embodiments disclosed herein automate network fingerprint based entity resolution for the purpose of network endpoint identification. The unified identity (e.g., unified hardware device label) of any network endpoint in a network, which may be derived by embodiments disclosed herein, may subsequently be applied in implementing network services (e.g., cyber security applications) targeting the welfare of the network endpoint. To that end, the embodiments disclosed herein may employ a combination of algorithms that may include, but may not be limited to, natural language processing (NLP), heuristics, and machine learning using distant supervision.

In the following detailed description of the embodiments disclosed herein, numerous specific details are set forth in order to provide a more thorough understanding of the various embodiments. However, it will be apparent to one of ordinary skill in the art that the disclosure may be practiced without these specific details. In other instances, well-known features have not been described in detail to avoid unnecessarily complicating the description.

In the following description of FIGS. 1A-8G any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connecting the operatively connected components) connection.

FIG. 1A shows a system in accordance with one or more embodiments disclosed herein. The system (100) may include, but may not be limited to, a network controller (102), two or more data sources (104A-104N), a network of network devices (106), two or more network fingerprint parsers (112A-112N), and a set of network endpoints (114A-114N). Each of these system (100) components is described below.

In one or more embodiments disclosed herein, the network controller (102) may represent one or many physical device(s), and/or software executing on said physical device(s), that serve(s) as an orchestration point for the functions of the network of network devices (106). To that end, the network controller (102) may be responsible for the operational management, configuration, monitoring, automation, and/or troubleshooting of the network of network devices (106). One of ordinary skill, however, will appreciate that the network controller (102) may perform other functionalities without departing from the scope of the disclosure. Further, by way of examples, the network controller (102) may be implemented using one or many network server(s) and/or any number of computing systems similar to the exemplary computing system shown and described with respect to FIG. 7, below. Moreover, the network controller (102) is illustrated and described in further detail below with respect to FIG. 1B.

In one or more embodiments disclosed herein, a data source (104A-104N) may represent a third-party repository, and/or a third-party service managing said repository, of data whereon various information may be stored and/or indexed. A data source (104A-104N), accordingly, may be implemented using one or many network server(s) (not shown). Each network server may refer to a physical network server, which may reside in a datacenter, or a virtual network server that may reside in a cloud computing environment. Additionally, or alternatively, a data source (104A-104N) may be implemented using one or many computing system(s) similar to the exemplary computing system shown and described with respect to FIG. 7, below. Furthermore, a data source (104A-104N) may include functionality to: receive queries, concerning certain contexts or subject matter, from query submitters (e.g., network controller (102)); process the queries to obtain query results, including data stored in said repository related to the aforementioned certain contexts or subject matter; and transmit (or otherwise provide) the query results back to the query submitters. Examples of a data source (104A-104N) may include, but may not be limited to, a web search engine and an online encyclopedia.

In one or more embodiments disclosed herein, the network of network devices (106) may represent a network topology of network devices (e.g., any number of spine devices (108A-108N) and any number of leaf devices (110A-110N)) formed for the purpose of facilitating network connectivity (or operative connections) amongst each other and the set of network endpoints (114A-114N). As used herein, the term operative connection, or operatively connected, means there exists, between elements or components, a direct or indirect connection that enables the elements/components to interact with one another in some way. For example, such elements/components may exchange information, send instructions to perform actions, cause changes in state and/or operating condition, etc. Additionally, as used herein, the network of network devices (106) may reflect an entire network or any portion thereof (e.g., a logical portion of the network devices within the network topology). Further, the network of network devices (106) may include a datacenter network, a wide area network such as the Internet, a local area network, any other suitable network that facilitates the exchange of information from one part of the network of network devices (106) to another, or any combination thereof.

In one or more embodiments disclosed herein, a network topology may refer to an arrangement or schema through which network devices (e.g., any number of spine devices (108A-108N) and any number of leaf devices (110A-110N)) may be interconnected. By way of an example, a network topology may reflect a bipartite network topology, which includes at least two sets of network devices, with connections between network devices of one set and network devices of another set, but no connections between network devices within a given set. Examples of said bipartite network topologies may include, but may not be limited to, a folded three-stage Clos network topology (e.g., a spine-leaf network topology), a fat tree topology (i.e., a Leiserson network topology), etc. Further, a network topology may include network devices that may be highly interconnected, with, as an example, each network device in a first set of network devices being connected to each network device in a second set of network devices within the network topology. In the exemplary embodiment shown in FIG. 1A, the network topology of the network of network devices (106) is a spine-leaf network topology. Further, although FIG. 1A shows an example of a spine-leaf network topology, in one or more embodiments disclosed herein, the network topology is not limited to reflecting a spine-leaf network topology (or the particular example shown), or any other example of a network topology set forth herein.

In one or more embodiments disclosed herein, in a spine-leaf network topology, the network of network devices (106) may be partitioned into a leaf layer and a spine layer. The leaf layer may encompass any number of network devices (e.g., leaf devices (110A-110N)) that provide network connectivity to any number of network endpoints (e.g., the set of network endpoints (114A-114N)). On the other hand, the spine layer may encompass any number of network devices (e.g., spine devices (108A-108N)) that at least provide network connectivity between network devices of the leaf layer.

In one or more embodiments disclosed herein, in a spine-leaf network topology, each network device of the leaf layer (e.g., leaf devices (110A-110N)) may operatively connect to each network device of the spine layer (e.g., spine devices (108A-108N)); and, similarly, each network device of the spine layer may operatively connect to each network device of the leaf layer.

In one or more embodiments disclosed herein, any network device (e.g., each of the spine devices (108A-108N) and each of the leaf devices (110A-110N)) may represent a physical device at least configured to facilitate communication and interaction between any pair or more of network endpoints (e.g., the set of network endpoints (114A-114N)). Further, any network device may include and/or may operatively connect to persistent storage (not shown), memory (e.g., random access memory (RAM)) (not shown), one or more computer processor(s) (e.g., integrated circuits) (not shown), and two or more physical network interfaces (also referred to as ports) (not shown).

In one or more embodiments disclosed herein, any network device may further include one or more network chips or network processors (not shown), which is/are separate component(s) from the computer processor(s) (e.g., central processing unit(s)) thereon. A network chip/processor may refer to any hardware (e.g., circuitry), software, firmware, and/or combination thereof that may include functionality to receive, process, and/or transmit network traffic based on a programmed configuration thereon. In order to perform such functionality, a network chip/processor may include any number of subcomponents, which may include, but may not be limited to, integrated circuit(s), buffer(s) (e.g., for implementing receive and/or transmit queues, such as virtual output queues (VOQs)), any type or amount of non-volatile storage, and/or any type or amount of volatile storage (e.g., RAM). Further, a network chip/processor may also include and/or operatively connect to any number of physical network interfaces of a host network device. Such interfaces may provide a path external to the host network device (e.g., to other network devices and/or network endpoints), and/or may operatively connect to other subcomponents internal to the host network device, where each such interface may function as an ingress and/or egress interface.

As a non-limiting example, a network chip/processor may represent hardware that receives network traffic (e.g., media access control (MAC) frames, Internet Protocol (IP) packets, etc.) at an ingress port, and determines out of which egress port(s) on the host network device to forward the network traffic.

In one or more embodiments disclosed herein, any network device may include functionality to receive network traffic (e.g., frames, packets, etc.) at any of the physical network interfaces (i.e., ports) of the network device, and to analyze the received network traffic in order to determine whether to: (i) drop the network traffic; (ii) process the network traffic; and/or (iii) transmit the network traffic, based on the processing, from one or more other physical network interfaces or ports of the network device in accordance with one or more embodiments described herein.

In one or more embodiments disclosed herein, any network device may also include functionality to store (e.g., in persistent storage, in memory, etc.) any number of data structures for facilitating operation of at least some aspects of the network device. Examples of such data structures may include, but may not be limited to, a routing information base (RIB) (not shown) and a forwarding information base (FIB) (not shown). Moreover, any network device may include software and/or firmware stored in any network device storage (not shown) and/or network device memory (not shown) (i.e., non-transitory computer readable mediums). Said software may include instructions which, when executed by the computer processor(s) of the network device, enable the computer processor(s) to perform operations in accordance with one or more embodiments described herein. The software instructions may take form as computer readable program code, which may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by the computer processor(s), is configured to perform functionality related to embodiments disclosed herein. The functionality of any network device is not limited to the aforementioned examples.

Examples of any network device may include, but may not be limited to, a network switch, a network router, a multilayer network switch, a fibre channel device, an InfiniBand® device, etc. Further, any network device is not limited to the aforementioned specific examples. Leaf devices (110A-110N) are illustrated and described in further detail below with respect to FIG. 1C.

In one or more embodiments disclosed herein, a network fingerprint parser (112A-112N) may represent a third-party repository, and/or a third-party service managing said repository, of data whereon network fingerprints (described below), as well as inferred hardware device information associated therewith, may be stored and/or indexed. A network fingerprint parser (112A-112N), accordingly, may be implemented using one or many network server(s) (not shown). Each network server may refer to a physical network server, which may reside in a datacenter, or a virtual network server that may reside in a cloud computing environment. Additionally, or alternatively, a network fingerprint parser (112A-112N) may be implemented using one or many computing system(s) similar to the exemplary computing system shown and described with respect to FIG. 7, below. Furthermore, a network fingerprint parser (112A-112N) may include functionality to: receive requests, including network fingerprints, from request submitters (e.g., network controller (102)); process the requests to obtain request results, including one or many network endpoint label(s) inferred from the network fingerprints; and transmit (or otherwise provide) the request results back to the request submitters.

In one or more embodiments disclosed herein, a network fingerprint may refer to information descriptive of hardware, software, and/or firmware respective to or operating on a given computing system (e.g., a network endpoint (114A-114N)) for the purpose of identification. Said information may be compiled into a brief character string (e.g., a sequence of characters, including letters, numbers, and/or symbols), and may be formatted using varying schema depending on a computer program (e.g., web browser, email client, etc.) on the given computing system, and/or network protocol (e.g., hypertext transfer protocol (HTTP), dynamic host configuration protocol (DHCP), transmission control protocol (TCP), domain network system (DNS) protocol, etc.) used thereby, which may be configured to produce and/or propagate said character string through a network (e.g., the network of network devices (106)). Said computer program may also be referred to herein as a user agent, or any software, which on behalf of a user, may retrieve, render, and facilitate user-interaction with accessible and searchable content and/or services hosted across any information technology (IT) infrastructures or environments.

In one or more embodiments disclosed herein, a network endpoint (114A-114N) may represent any physical appliance or computing system at least configured to receive, generate, process, store, and/or transmit data, as well as to provide an environment in which one or many computer program(s) may execute thereon. At least a subset of the computer program(s) may encompass any of said user agent(s) (described above) responsible for generating network fingerprints (described above). Further, in providing an execution environment for any computer program(s) installed thereon, a network endpoint (114A-114N) may include and allocate various resources (e.g., computer processors, memory, storage, virtualization, network bandwidth, etc.), as needed, to the computer program(s) and the tasks (or processes) instantiated thereby. A network endpoint (114A-114N) may include functionality to receive, generate, process, store and/or transmit network traffic (e.g., network packets) in order to, for example, interact with other network endpoints (114A-114N), as well as web-accessible content and/or services, through the network of network devices (106). One of ordinary skill, however, will appreciate that a network endpoint (114A-114N) may perform other functionalities without departing from the scope of the disclosure. Examples of a network endpoint (114A-114N) may include, but may not be limited to, a desktop computer, a laptop computer, a tablet computer, a smartphone, an Internet of Things (IoT) device, or any other computing system similar to the exemplary computing system shown and described with respect to FIG. 7, below.

While FIG. 1A shows a configuration of components and/or subcomponents, other system (100) configurations may be used without departing from the scope of the disclosure.

FIG. 1B shows a network controller in accordance with one or more embodiments disclosed herein. The network controller (102) may include, but may not be limited to, a data source inquirer (120), a fingerprint parser requestor (122), an endpoint welfare service (124), a unified label service (126), and a unified label database (128). Each of these network controller (102) subcomponents is described below.

In one or more embodiments disclosed herein, the data source inquirer (120) may refer to a computer program, or process(es) thereof, that may operate on the underlying hardware of the network controller (102), which may implement and manage the role of interacting with one or many data source(s) (104A-104N) (described above) (see e.g., FIG. 1A). To that end, the data source inquirer (120) may include functionality to: obtain one or many network endpoint label keyword(s) from the unified label service (126); for each network endpoint label keyword, (a) submit queries, concerning the network endpoint label keyword, to the data source(s) (104A-104N); and (b) in response to the queries, receive query results, including information relative or pertinent to the network endpoint label keyword, from the data source(s) (104A-104N); and provide the query results, for the network endpoint label keyword(s), back to the unified label service (126). One of ordinary skill, however, will appreciate that the data source inquirer (120) may perform other functionalities without departing from the scope of the disclosure.

In one or more embodiments disclosed herein, the fingerprint parser requestor (122) may refer to a computer program, or process(es) thereof, that may operate on the underlying hardware of the network controller (102), which may implement and manage the role of interacting with one or many network fingerprint parser(s) (112A-112N) (described above) (see e.g., FIG. 1A). To that end, the fingerprint parser requestor (122) may include functionality to: obtain a network fingerprint (see e.g., FIG. 1A), associated with a network endpoint, from the unified label service (126); submit requests, including the network fingerprint, to the network fingerprint parser(s) (112A-112N); in response to the requests, receive request results, including one or many network endpoint label(s) for the network endpoint, from the network fingerprint parser(s) (112A-112N); and provide the request results back to the unified label service (126). One of ordinary skill, however, will appreciate that the fingerprint parser requestor (122) may perform other functionalities without departing from the scope of the disclosure.

In one or more embodiments disclosed herein, the endpoint welfare service (124) may refer to a computer program, or process(es) thereof, that may operate on the underlying hardware of the network controller (102), which may implement and manage the role of providing a network service targeting the welfare of one or many network endpoint(s). To that end, the endpoint welfare service (124) may include functionality to: obtain a unified network endpoint label, associated with a network endpoint, from the unified label service (126); adjust or tune the provided network service based at least on the unified network endpoint label, to obtain an endpoint-adjusted network service; and apply said endpoint-adjusted network service, to the network endpoint, by way of instructions transmitted to an appropriate endpoint welfare client (see e.g., FIG. 1C) operating on a leaf device (110) directly connected to the network endpoint. One of ordinary skill, however, will appreciate that the endpoint welfare service (124) may perform other functionalities without departing from the scope of the disclosure.

By way of an example, the network service, which the endpoint welfare service (124) may provide, may be directed to cyber security threat detection and response. That is, users often find themselves, or rather their hardware devices (e.g., network endpoints), as targets of cyber threats, attacks, and other activities of malicious intent. Further, as said malicious activities tend to be tailored to particular hardware and/or software platform(s) or architecture(s), an effective countering stratagem to identify and address said malicious activity may entail adjusting, tuning, or calibrating the network service (e.g., cyber security threat detection and response) to specific device types (i.e., network endpoint types). Accordingly, in analyzing network packets originating from network endpoints, thus leading to the extraction and processing of network fingerprints therefrom, the identification or type (e.g., a unified network endpoint label) of any network endpoint may be obtained.

In one or more embodiments disclosed herein, the unified label service (126) may refer to a computer program, or process(es) thereof, that may operate on the underlying hardware of the network controller (102), which may implement and manage the role of providing a network service directed to network endpoint identification through network fingerprint based entity resolution. To that end, the unified label service (126) may include functionality to at least perform the methods outlined with respect to FIGS. 2-5F, below. One of ordinary skill, however, will appreciate that the unified label service (126) may perform other functionalities without departing from the scope of the disclosure.

In one or more embodiments disclosed herein, the unified label database (128) may refer to a data repository, implemented and supported by the underlying hardware of the network controller (102), which may store network fingerprint to unified network endpoint label mappings. A network fingerprint to unified network endpoint label mapping may reference a database entry storing, and thus relating, a network fingerprint for a network endpoint to a unified network endpoint label derived for the network endpoint. The unified network endpoint label may refer to an arbitrary-length character string that best describes or identifies a device type derived for a network endpoint.

In one or more embodiments disclosed herein, the unified label database (128) may be implemented, at least in part, using volatile memory (e.g., random access memory (RAM)). Additionally, or alternatively, the unified label database (128) may be implemented, at least in part, using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments disclosed herein, the unified label database (128) may reflect a distributed, publish-subscribe modeled data repository. That is, in adopting the publish-subscribe model, the unified label database (128), once updated, may automatically push or publish said update(s) to one or many subscribing entities interested in said update(s). These subscribing entities may include, but may not be limited to, one or many copy (copies) (or instance(s)) of the unified label database (not shown) (described below) (see e.g., FIG. 1C) dispersed across one, many, or each leaf device (110) in the network of network devices.

While FIG. 1B shows a configuration of components and/or subcomponents, other network controller (102) configurations may be used without departing from the scope of the disclosure. For example, in one or more embodiments disclosed herein, the unified label service (126) may subsume the data source inquirer (120), the fingerprint parser requestor (122), and/or the unified label database (128), as well as their respective functionalities described above. By way of another example, in one or more other embodiments disclosed herein, the network controller (102) may host more than one endpoint welfare service (not shown).

Figure 1C:
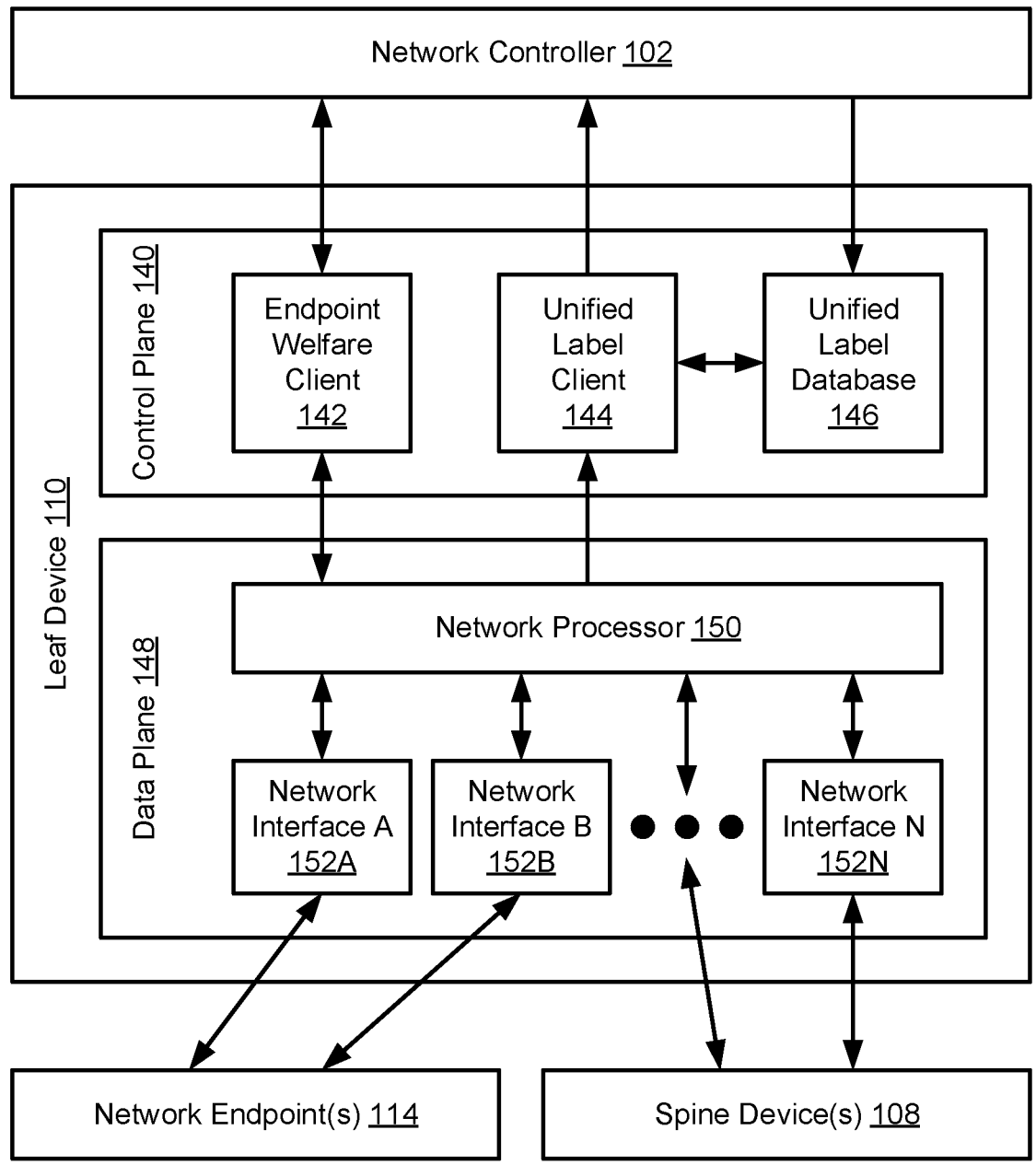
FIG. 1C shows a leaf device in accordance with one or more embodiments disclosed herein.

FIG. 1C shows a leaf device in accordance with one or more embodiments disclosed herein. The leaf device (110) may include, but may not be limited to, a control plane (140) and a data plane (148). The control plane (140) may represent a portion of the leaf device (110) architecture responsible for determining where to send network traffic. The determinations may rely, at least in part, on a dynamically changing network topology maintained by the control plane (140) through the sharing of routing (and/or other networking) protocol information amongst the leaf device (110) and the other network devices (e.g., spine devices (108)) of the network of network devices (not shown). The data plane (148), on the other hand, may represent another portion of the leaf device (110) architecture responsible for receiving, parsing, processing, modifying, and transmitting network traffic. Further, the data plane (148) may process and forward network traffic to one or many destination(s) (e.g., other network device(s) (108) and/or network endpoint(s) (114)) based on various data structures, policies, rules, and/or other information and instructions, which may be configured, managed, and updated by the control plane (140).

In one or more embodiments disclosed herein, the control plane (140) may include, but may not be limited to, an endpoint welfare client (142), a unified label client (144), and a unified label database (146). Each of these control plane (140) subcomponents is described below.

In one or more embodiments disclosed herein, the endpoint welfare client (142) may refer to a computer program, or process(es) thereof, that may operate on the underlying hardware of the leaf device (110), which may, at least in part, implement a network service targeting the welfare of one or many network endpoint(s) (114) directly connected to the leaf device (110). To that end, the endpoint welfare client (142) may include functionality to: collect copies of network traffic destined to the network endpoint(s) (114); transmit said network traffic copies to an endpoint welfare service (see e.g., FIG. 1B) operating on the network controller (102) for network packet analyses; receive, from the endpoint welfare service, instructions pertinent to the welfare of the network endpoint(s) (114); and execute said instructions to apply or implement a desired network service action targeting the network endpoint(s) (114). One of ordinary skill, however, will appreciate that the endpoint welfare client (142) may perform other functionalities without departing from the scope of the disclosure.

By way of an example, the endpoint welfare client (142) may, at least in part, implement a network service directed to cyber security threat detection and response. In said example, copies of network packets acquired by the endpoint welfare client (142) may be relayed to the endpoint welfare service on the network controller (102) to undergo network packet analyses relevant to cyber security threat detection and response. Further, said network packet analyses may be tuned, adjusted, or calibrated to a device type (e.g., unified network endpoint label), derived for the network endpoint(s) (114), for optimal performance and effectiveness of the network service. Moreover, based on said network packet analyses, the endpoint welfare client (142) may receive, from the endpoint welfare service, instructions pertaining to the handling of prospective, suspicious network traffic traversing the leaf device (110) to reach the network endpoint(s) (114). By way of an example, said instructions may direct the endpoint welfare client (142) to program constructs (e.g., data structures, rules, policies, etc.) internal, or operatively connected, to the network processor (150) that permit or deny network traffic destined to the network endpoint(s) (114) based on certain network packet characteristics or properties.

In one or more embodiments disclosed herein, the unified label client (144) may refer to a computer program, or process(es) thereof, that may operate on the underlying hardware of the leaf device (110), which may, at least in part, implement a network service directed to network endpoint identification through network fingerprint based entity resolution. To that end, the unified label client (144) may include functionality to at least perform the method outlined with respect to FIG. 6, below. One of ordinary skill, however, will appreciate that the unified label client (144) may perform other functionalities without departing from the scope of the disclosure.

In one or more embodiments disclosed herein, the unified label database (146) may refer to a data repository, implemented and supported by the underlying hardware of the leaf device (110), which may store network fingerprint to unified network endpoint label mappings. A network fingerprint to unified network endpoint label mapping may reference a database entry storing, and thus relating, a network fingerprint for a network endpoint (114) to a unified network endpoint label derived for the network endpoint (114). The unified network endpoint label may refer to an arbitrary-length character string that best describes or identifies a device type derived for a network endpoint (114).

In one or more embodiments disclosed herein, the unified label database (146) may be implemented, at least in part, using volatile memory (e.g., random access memory (RAM)). Additionally, or alternatively, the unified label database (136) may be implemented, at least in part, using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments disclosed herein, the unified label database (146) may operatively connect to, and thus represent a copy or instance of, a master unified label database (not shown) residing on the network controller (102) (see e.g., FIG. 1B). Further, the unified label database (146) may relate to the master unified label database as a subscriber or receiver of update(s) to the master unified label database.

In one or more embodiments disclosed herein, the data plane (148) may include, but may not be limited to, a network processor (150) and two or more network interfaces (152A-152N). Each of these data plane (148) subcomponents is described below.

In one or more embodiments disclosed herein, the network processor (150) may refer to a specialized integrated circuit predominantly responsible for the receiving, processing, and forwarding of network traffic (e.g., network packets) that may be traversing the leaf device (110) in order to reach one or many neighbor network devices (e.g., one or many spine device(s) (108)) and/or one or many network endpoint(s) (114). To perform the aforementioned functionality, the network processor (150) may utilize various constructs (e.g., data structures, rules, policies, etc.) (not shown) in order to determine out which network interface(s) (152A-152N) to forward any received network traffic. These constructs may be supported in memory (e.g., ternary content-addressable memory (TCAM)) (not shown) which may be internal, or operatively connected to, the network processor (150). Further, these constructs may be programmed (e.g., modified, updated, etc.) dynamically by any number of agents (described above) (e.g., endpoint welfare client (142)) executing on the control plane (140), and/or statically by way of administrator commands. The network processor (150) may perform other functionalities without departing from the scope of the disclosure such as, for example, parse any received network packets from any network endpoint (114) to extract a network fingerprint embedded in the packet header information thereof, and publish (or otherwise provide) the network fingerprint such that the unified label client (144) may obtain said network fingerprint.

In one or more embodiments disclosed herein, any network interface (152A-152N) may refer to circuitry that serves as a point of interconnection between the leaf device (110) and a neighbor network device (e.g., a spine device (108)) or a network endpoint (114). Further, any network interface (152A-152N) may include functionality to receive and/or transmit bit streams (forming network traffic) across physical or wired connections (e.g., via copper-wired Ethernet cable, fiber-optic cable, etc.) from and/or to a neighbor network device (108) or a network endpoint (114). In one or more other embodiments disclosed herein, at least a subset of the network interfaces (152A-152N) may facilitate operative connection to network endpoint(s) (114) through wireless connectivity and/or protocols.

While FIG. 1C shows a configuration of components and/or subcomponents, other leaf device (110) configurations may be used without departing from the scope of the disclosure. For example, in one or more embodiments disclosed herein, the control plane (140) may host more than one endpoint welfare client (not shown).

Figure 2:
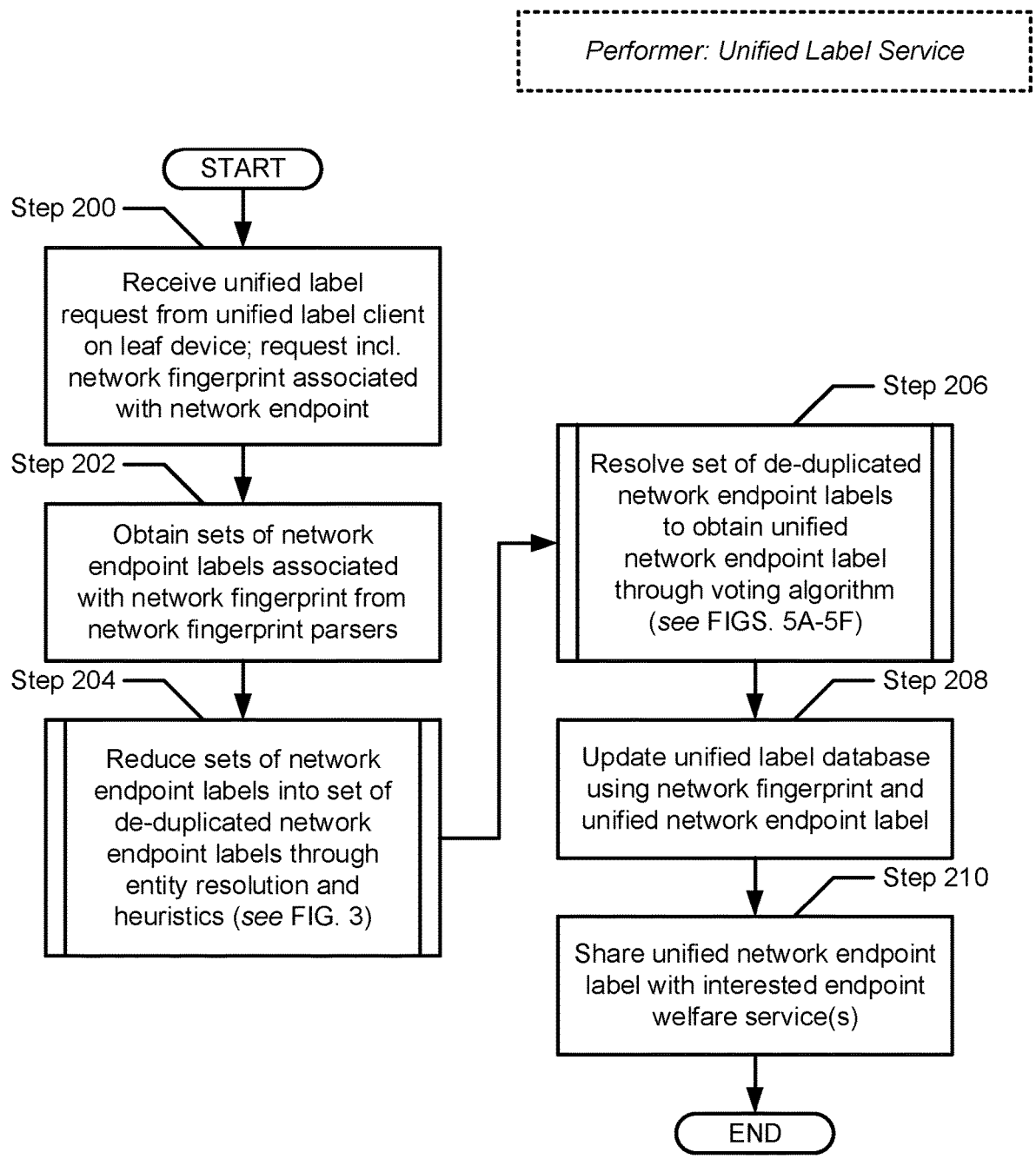
FIG. 2 shows a flowchart describing a method for network endpoint identification through network fingerprint based entity resolution in accordance with one or more embodiments disclosed herein.

FIG. 2 shows a flowchart describing a method for network endpoint identification through network fingerprint based entity resolution in accordance with one or more embodiments disclosed herein. The various steps outlined below may be performed by the unified label service operating on the network controller (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a unified label request is received from a unified label client operating on a leaf device (see e.g., FIG. 1C). In one or more embodiments disclosed herein, the unified label request may include a network fingerprint, where the network fingerprint may be associated with, and thus reflect information descriptive of hardware, software, and/or firmware respective to or operating on, a network endpoint. Further, the network endpoint may be directly connected, either via a wired or wireless connection, to the aforementioned leaf device.

In Step 202, at least two network endpoint label sets are obtained. In one or more embodiments disclosed herein, each network endpoint label set may include one or many network endpoint label(s) inferred by a different network fingerprint parser (see e.g., FIG. 1A) of at least two network fingerprint parsers. Further, each network endpoint label in a/any network endpoint label set may refer to a character string that classifies, identifies, or describes the network endpoint, at least in part, based on the network fingerprint (received in Step 200) (which may have been submitted to each different network fingerprint parser as a precursor to obtaining the network endpoint label set therefrom).

In Step 204, the at least two network endpoint label sets (obtained in Step 202) are reduced to obtain a de-duplicated network endpoint label set. In one or more embodiments disclosed herein, the de-duplicated network endpoint label set may include one or many de-duplicated network endpoint label(s) (described below) (see e.g., FIG. 3). Further, said reduction of the at least two network endpoint label sets may entail entity resolution, as well as a set of heuristics. Step 204 is illustrated and described in further detail with respect to FIG. 3, below.

In Step 206, the de-duplicated network endpoint label set (obtained in Step 204) is resolved to obtain a unified network endpoint label. In one or more embodiments disclosed herein, the unified network endpoint label may refer to a network endpoint label (described above), or a derivation at least thereof, that best identifies the network endpoint based on the network fingerprint (received in Step 200). Further, said resolution of the de-duplicated network endpoint label set may entail a voting algorithm Step 206 is illustrated and described in further detail with respect to FIGS. 5A-5F, below.

In Step 208, a (master) unified label database (see e.g., FIG. 1B) is updated. In one or more embodiments disclosed herein, the (master) unified label database may be updated to include a new database entry, where the new database entry may include the network fingerprint (received in Step 200) and the unified network endpoint label (obtained in Step 206). Further, as a result of updating the (master) unified label database, one or many other unified label database(s), across one, many, or each leaf device (see e.g., FIG. 1C), may be updated thereafter, such as based on a publish-subscribe architecture.

In Step 210, at least the unified network endpoint label (obtained in Step 206), is subsequently shared with one or many endpoint welfare service(s). In one or more embodiments disclosed herein, any endpoint welfare service may represent or provide a network service targeting the welfare of one or many network endpoint(s). Further, based on the unified network endpoint label, which may best identify the network endpoint, said represented or provided network service may be adjusted, tuned, or calibrated for optimal performance and/or effectiveness at least while directed to the network endpoint. By way of an example, the network service represented or provided by at least one endpoint welfare service may pertain to cyber security threat detection and response.

Figure 3:
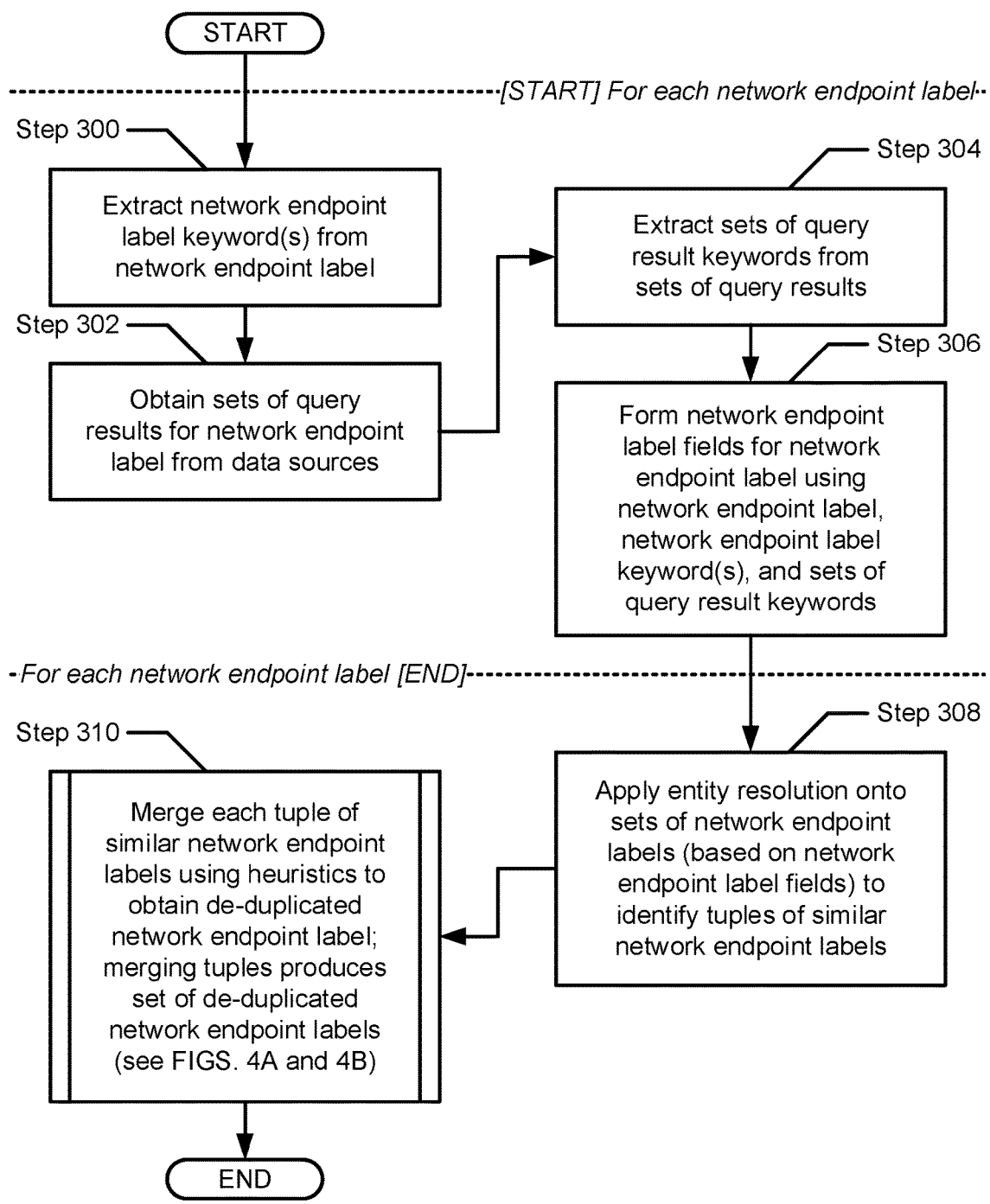
FIG. 3 shows a flowchart describing a method for reducing network endpoint label sets into a de-duplicated network endpoint label set in accordance with one or more embodiments disclosed herein.

FIG. 3 shows a flowchart describing a method for reducing network endpoint label sets into a de-duplicated network endpoint label set in accordance with one or more embodiments disclosed herein. The various steps outlined below may be performed by the unified label service operating on the network controller (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, hereinafter, a subset (i.e., Steps 300, 302, 304, and 306) of the following various steps may be performed, iteratively as a whole, for each network endpoint label (across or throughout the at least two network endpoint label sets (obtained in Step 202 of FIG. 2)). For example, a first iteration of the aforementioned various steps subset may be performed with respect to a first network endpoint label; thereafter, a second iteration of the aforementioned various steps subset may be performed with respect to a second network endpoint label; and so forth, including a last iteration of the aforementioned various steps subset that may be performed with respect to a last network endpoint label. Furthermore, throughout any given iteration of the aforementioned various steps subset, the network endpoint label, respective to the given iteration, may be termed or referred to hereinafter as the given network endpoint label.

In Step 300, one or many network endpoint label keyword(s) is/are extracted from the given network endpoint label. In one or more embodiments disclosed herein, each network endpoint label keyword may refer to one of the most mentioned or relevant text words disclosed in the given network endpoint label. Further, extraction of the network endpoint label keyword(s) may entail any known keyword extraction technique or algorithm (e.g., encompassing machine learning and/or artificial intelligence with natural language processing (NLP)).

In Step 302, at least two query result sets are obtained. In one or more embodiments disclosed herein, each query result set may include one or many query result(s) inferred by a different data source (see e.g., FIG. 1A) of at least two data sources. Further, each query result may encompass information, stored or otherwise accessible by a data source, that may be most relevant to the given network endpoint label (which may have been submitted to each different data source as a precursor to obtaining the query result set therefrom).

In one or more embodiments disclosed herein, the query result(s) inferred by a data source may differ in schema or format depending on a nature of the data source. For example, if a data source is a web search engine, then the obtained query result set therefrom may entail one or many search engine result page(s) (SERP(s)). The SERP(s) may include a listing of world-wide web (WWW) webpages, ranked by relevance to the submitted query, along with titles of, universal resource locators (URLs) pointing to, as well as short descriptions summarizing, the webpages, respectively. By way of another example, if a data source is an online encyclopedia, then the obtained query result set therefrom may entail a listing of encyclopedia articles, also ranked by relevance to the submitted query, along with titles of, URLs pointing to, and short descriptions summarizing, the articles, respectively.

In Step 304, one or many query result keyword(s) is/are extracted from each query result set of the at least two query result sets (obtained in Step 302), thereby leading to the extraction of at least two query result keyword sets. In one or more embodiments disclosed herein, each query result keyword, extracted from any query result set, may refer to one of the most mentioned or relevant text words disclosed in the query result set. Further, extraction of the query result keyword(s), per query result set, may entail any known keyword extraction technique or algorithm (e.g., encompassing machine learning and/or artificial intelligence with natural language processing (NLP)).

In Step 306, a network endpoint label field set is formed. In one or more embodiments disclosed herein, the network endpoint label field set may include many network endpoint label fields (or data fields) that each, at least in part, constitute a record (or data record), where the record may pertain to or reference the given network endpoint label. Further, the network endpoint label fields may include, but may not be limited to: the given network endpoint label itself; the network endpoint label keyword(s) (extracted in Step 300); and each query result keyword set (as a separate network endpoint label field) of the at least two query result keyword sets (extracted in Step 304).

In Step 308, entity resolution is applied onto the at least two network endpoint label sets (obtained in Step 202 of FIG. 2). In one or more embodiments disclosed herein, entity resolution may generally encompass the challenge of identifying records (e.g., network endpoint label field sets (obtained in Step 306)) across two or more datasets (e.g., network endpoint label sets), from two or more sources (e.g., network fingerprint parsers), respectively, that reference the same entity (e.g., hardware device, software application (e.g., user agent), operating system, etc. identified or otherwise described in a network fingerprint for a network endpoint).

Accordingly, the application of entity resolution, at least with respect to one or more embodiments disclosed herein, may rely on similarities, which may be quantified or measured, between a combination of network endpoint labels, where each network endpoint label in the said combination stems from a different network endpoint label set, or more specifically, a different network fingerprint parser. The aforementioned similarities between the combination of network endpoint labels, by virtue of constituency, may extend to quantifiable or measurable similarities between the respective network endpoint label field sets thereof. As each network endpoint label field (described above) in any network endpoint label field set fundamentally represents a character string, said similarities between any combination of network endpoint label field sets may be quantified or measured using one or more existing string similarity metrics or string distance functions (e.g., affine gap string distance, cosine similarity metric, Hamming distance, Jaro-Winkler distance, etc.).

Moreover, in one or more embodiments disclosed herein, in applying entity resolution onto the network endpoint label sets (obtained in Step 202 of FIG. 2), a similar network endpoint label tuple set may be identified. The similar network endpoint label tuple set may include one or many similar network endpoint label tuple(s), where each similar network endpoint label tuple may include at least two similar network endpoint labels (i.e., at least two network endpoint labels found to be similar by way of quantifiable or measurable similarities between their respective network endpoint label field sets). Further, the at least two similar network endpoint labels, per similar network endpoint label tuple, may reference a same or common entity and may each stem from a different network endpoint label set, or more specifically, a different network fingerprint parser.

In Step 310, the similar network endpoint label tuple set (identified in Step 308) is/are merged to obtain a de-duplicated network endpoint label set. In one or more embodiments disclosed herein, the de-duplicated network endpoint label set may include one or many de-duplicated network endpoint label(s), where each de-duplicated network endpoint label represents a similar network endpoint label, a derivation at least thereof, or a merger of the at least two similar network endpoint labels, in each similar network endpoint label tuple, respectively. Further, said merging of the similar network endpoint label set may entail the application of a set of heuristics (i.e., rules). Step 310 is illustrated and described in further detail with respect to FIGS. 4A and 4B, below.

Figure 4A:
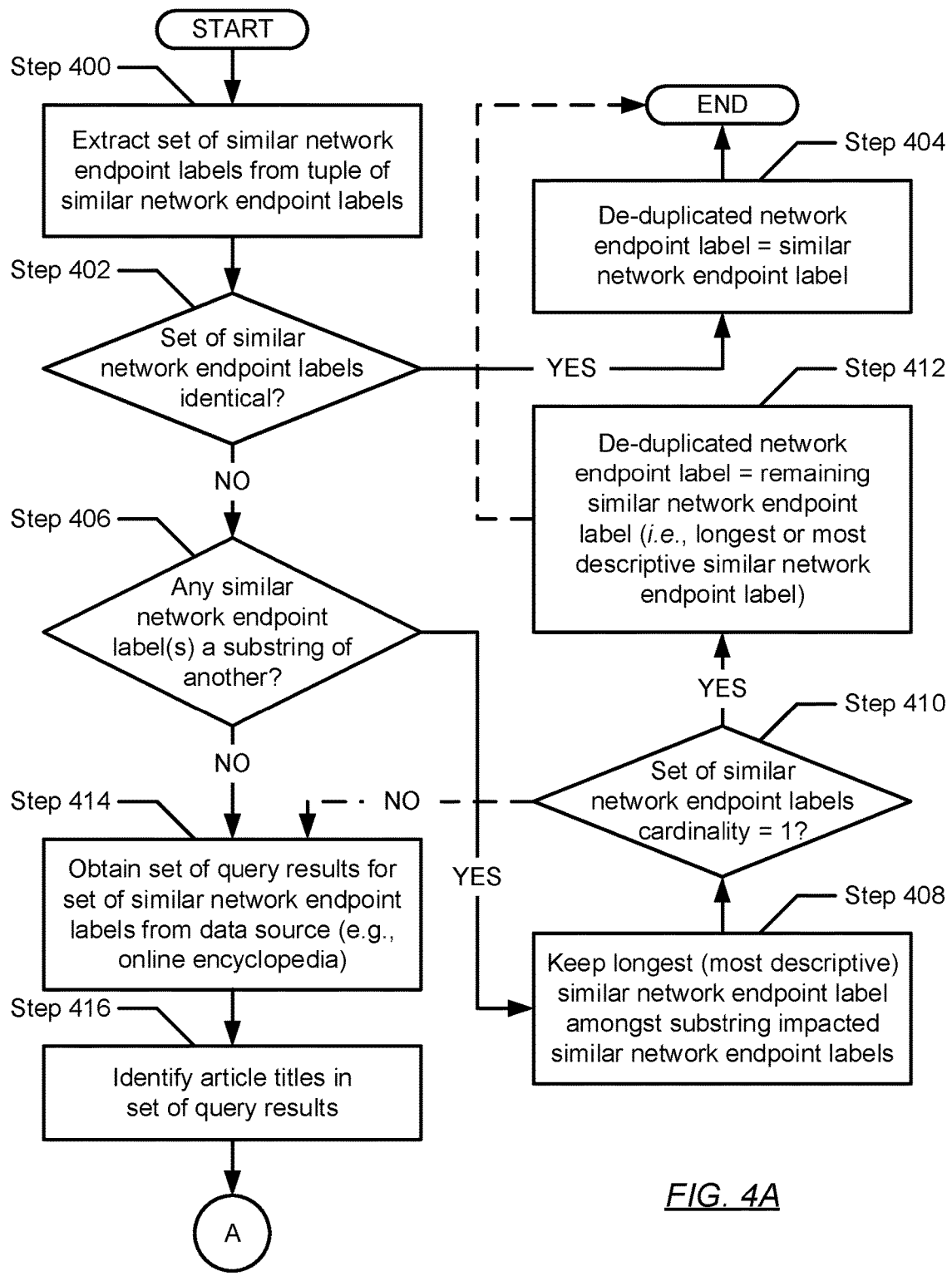
FIGS. 4A and 4B show flowcharts describing a method for merging similar network endpoint label tuples in accordance with one or more embodiments disclosed herein.
Figure 4B:
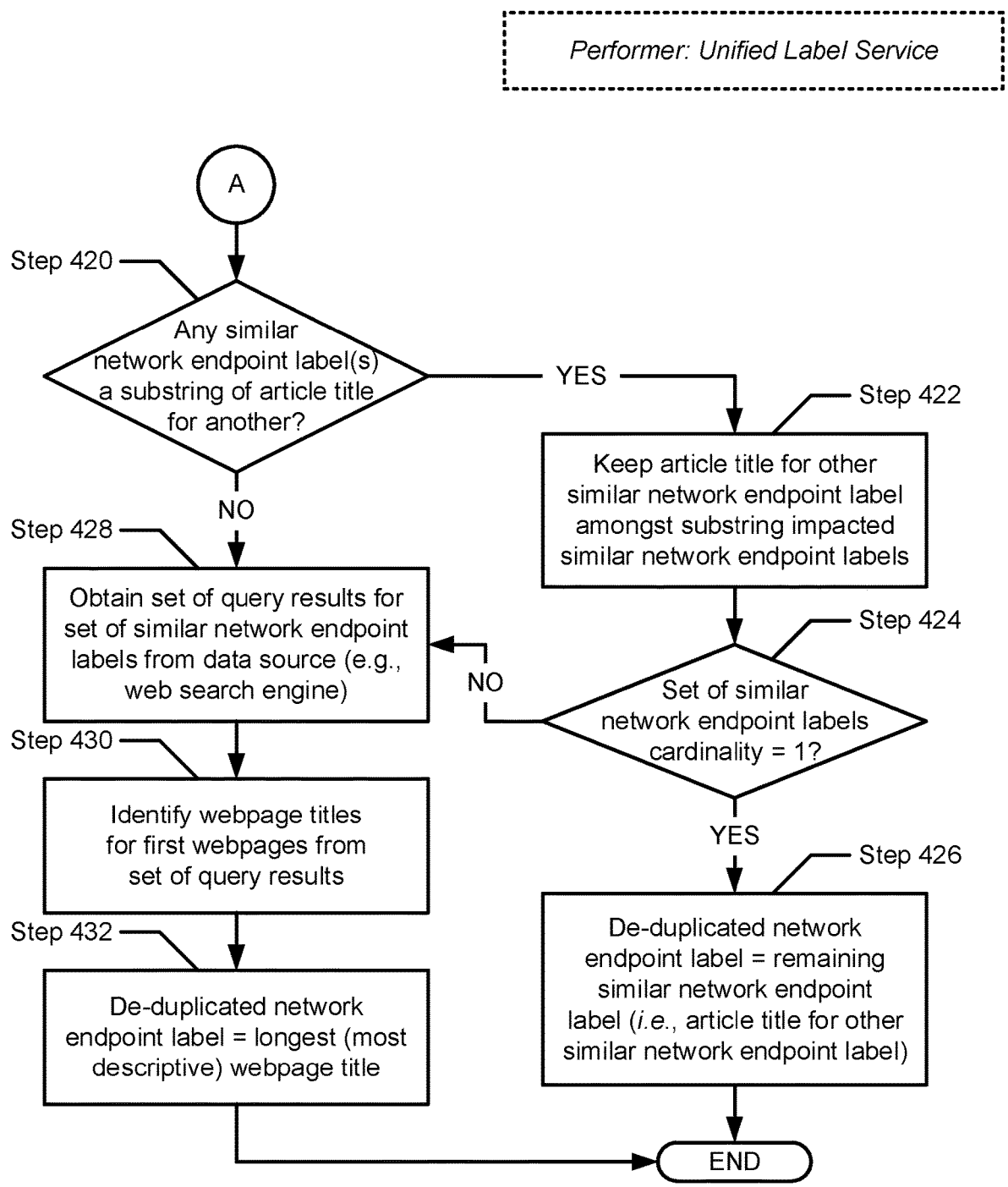

FIGS. 4A and 4B show a flowchart describing a method for merging similar network endpoint label tuples in accordance with one or more embodiments disclosed herein. The various steps outlined below may be performed by the unified label service operating on the network controller (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, for a given similar network endpoint label tuple (described above) (see e.g., FIG. 3), the similar network endpoint label set (i.e., including at least two similar network endpoint labels) therein are extracted therefrom. In one or more embodiments disclosed herein, the similar network endpoint labels of the similar network endpoint label set may each reference a same/common entity and may each represent a network endpoint label stemming from a different network endpoint label set, or more specifically, a different network fingerprint parser.

In Step 402, a determination is made as to whether the similar network endpoint label set (extracted in Step 400) are identical. In one or more embodiments disclosed herein, if it is determined that each similar network endpoint label, of the similar network endpoint label set, is identical to each other similar network endpoint label thereof, then the method proceeds to Step 404. On the other hand, in one or more other embodiments disclosed herein, if it is alternatively determined that each similar network endpoint label, of the similar network endpoint label set, is not identical to each other similar network endpoint label thereof, then the method alternatively proceeds to Step 406.

In Step 404, following the determination (made in Step 402) that each similar network endpoint label, of the similar network endpoint label set (extracted in Step 400), is identical to each other similar network endpoint label thereof, any one of the (identical) similar network endpoint labels is assigned as the de-duplicated network endpoint label for and derived from the given similar network endpoint label tuple.

In Step 406, following the alternative determination (made in Step 402) that each similar network endpoint label, of the similar network endpoint label set (extracted in Step 400), is not identical to each other similar network endpoint label thereof, a determination is made as to whether any similar network endpoint label(s), of the similar network endpoint label set, is/are a substring of any other similar network endpoint label(s) thereof. In one or more embodiments disclosed herein, if it is determined that at least one similar network endpoint label, of the similar network endpoint label set, is a substring of at least one other similar network endpoint label thereof, then the method proceeds to Step 408. On the other hand, in one or more other embodiments disclosed herein, if it is alternatively determined that none of the similar network endpoint labels, of the similar network endpoint label set, are a substring of any other similar network endpoint label(s) thereof, then the method alternatively proceeds to Step 414.

In Step 408, following the determination (made in Step 406) that at least one similar network endpoint label, of the similar network endpoint label set (extracted in Step 400), is a substring of at least one other similar network endpoint label thereof, the longer (or longest) (and thus most descriptive) similar network endpoint label, amongst the substring-impacted similar network endpoint labels (i.e., the at least one other similar network endpoint label and the at least one similar network endpoint label found to be a substring thereof), is kept or retained. Meanwhile, in one or more embodiments disclosed herein, the shorter similar endpoint label(s), of the similar network endpoint label set and amongst the aforementioned substring-impacted similar network endpoint labels, is/are discarded.

For example, when considering the similar network endpoint labels "linux" and "debian-linux", where the former is a substring of the latter, the longer (or more descriptive) of the two (i.e., "debian-linux") may be retained while the shorter of the two (i.e., "linux") may be discarded. By way of another example, when considering the similar network endpoint labels "iphone", "iphone 12", and "iphone 12 A2172", where the first and second similar network endpoint labels are each substrings of the third similar network endpoint label, the longest (or most descriptive) of the three (i.e., "iphone 12 A2172") may be retained while the shorter similar network endpoint labels (i.e., "iphone" and "iphone 12") are both discarded.

Further, in one or more embodiments disclosed herein, in discarding the above-mentioned shorter similar network endpoint label(s) from the similar network endpoint label set (extracted in Step 400), a second similar network endpoint label set may be obtained. The second similar network endpoint label set, accordingly, may reflect the set difference between the similar network endpoint label set and the discarded shorter similar network endpoint label(s).

In Step 410, a determination is made as to whether a cardinality of the second similar network endpoint label set (obtained in Step 408) equals one. That is, in one or more embodiments disclosed herein, if it is determined that the set difference between the similar network endpoint label set (extracted in Step 400) and the discarded shorter similar network endpoint label(s), includes a single similar network endpoint label (i.e., cardinality equals one), then the method proceeds to Step 412. On the other hand, in one or more other embodiments disclosed herein, if it is alternatively determined that the set difference between the similar network endpoint label set (extracted in Step 400) and the discarded shorter similar network endpoint label(s), includes multiple similar network endpoint labels (i.e., cardinality exceeds one), then the method alternatively proceeds to Step 414.

In Step 412, following the determination (made in Step 410) that a cardinality of the second similar network endpoint label set (obtained in Step 408) equals one, the single similar network endpoint label (i.e., the longer/longest, and thus most descriptive, similar network endpoint label)

therein is assigned as the de-duplicated network endpoint label for and derived from the given similar network endpoint label tuple.

In Step 414, following the alternative determination (made in Step 406) that none of the similar network endpoint labels, of the similar network endpoint label set (extracted in Step 400), are a substring of any other similar network endpoint label(s) thereof, or following the alternative determination (made in Step 410) that a cardinality of the second similar network endpoint label set (obtained in Step 408) exceeds one, a query result set is obtained for the similar network endpoint label set (or the second similar network endpoint label set). That is, in one or more embodiments disclosed herein, the query result set may include a query result respective to each similar network endpoint label of the similar network endpoint label set (extracted in Step 400). In one or more other embodiments disclosed herein, the query result set may include a query result respective to each similar network endpoint label of the second similar network endpoint label set (obtained in Step 408).

Furthermore, in one or more embodiments disclosed herein, each query result, of the query result set, may have been obtained from an online encyclopedia based data source. Moreover, each query result, of the query result set, may entail a listing of encyclopedia articles, ranked by relevance to the submitted query (i.e., a similar network endpoint label), along with titles of, universal resource locators (URLs) pointing to, and short descriptions summarizing, the encyclopedia articles, respectively.

In Step 416, from each query result, of the query result set (obtained in Step 414), an encyclopedia article title therefrom is identified. In one or more embodiments disclosed herein, the identified encyclopedia title may reference a topmost ranked encyclopedia article, by relevance, to the corresponding submitted query (i.e., a similar network endpoint label).

Turning to FIG. 4B, in Step 420, a determination is made as to whether any similar network endpoint label(s), of the similar network endpoint label set (extracted in Step 400) or of the second similar network endpoint label set (obtained in Step 408), is/are a substring of the encyclopedia article title(s) (identified in Step 416) respective to any other similar network endpoint label(s) thereof. In one or more embodiments disclosed herein, if it is determined that at least one similar network endpoint label, of the similar network endpoint label set or of the second similar network endpoint label set, is a substring of the identified encyclopedia article title respective to at least one other similar network endpoint label thereof, then the method proceeds to Step 422. On the other hand, in one or more other embodiments disclosed herein, if it is alternatively determined that none of the similar network endpoint labels, of the similar network endpoint label set or of the second similar network endpoint label set, are a substring of the identified encyclopedia article title(s) respective to any other similar network endpoint label(s) thereof, then the method alternatively proceeds to Step 428.

In Step 422, following the determination (made in Step 420) that at least one similar network endpoint label, of the similar network endpoint label set (extracted in Step 400) or of the second similar network endpoint label set (obtained in Step 408), is a substring of the encyclopedia article title (identified in Step 416) respective to at least one other similar network endpoint label thereof, the aforementioned encyclopedia article title, respective to the at least one other similar network endpoint label, is kept or retained in place of the aforementioned at least one other similar network endpoint label respective thereto. Meanwhile, in one or more embodiments disclosed herein, the at least one similar network endpoint label, found to be a substring of the kept/retained encyclopedia article title, may be discarded.

For example, when considering the following original or remaining similar network endpoint labels "linux" and "debian-linux", as well as their respective identified encyclopedia article titles "linux" and "debian gnu/linux", where the former label is a substring of the encyclopedia article title for the latter, said encyclopedia article tile (i.e., "debian gnu/linux") for the latter label may be retained while the former label, which was found to be a substring of said encyclopedia article title for the latter label, may be discarded. By way of another example, when considering the following original or remaining similar network endpoint labels "iphone", "iphone 12", and "iphone 12 A2172", as well as their respective identified encyclopedia article titles "iphone", "iphone 12", and "iphone 12", where the first label is a substring of both the encyclopedia article titles respective to the second and third labels, said encyclopedia article titles (i.e., "iphone 12" and "iphone 12") may be retained whereas the first label, found to be a substring of said encyclopedia article titles for the latter two labels, may be discarded.

Further, in one or more embodiments disclosed herein, in discarding the above-mentioned at least one similar network endpoint label, found to be a substring of the kept/retained encyclopedia article title, from the similar network endpoint label set (extracted in Step 400) or from the second similar network endpoint label set (obtained in Step 408), a third similar network endpoint label set may be obtained. The third similar network endpoint label set, accordingly, may reflect a set difference between a first intermediate set and a second intermediate set, where the first intermediate set reflects a first set union combining an origin set and any kept/retained encyclopedia article title(s), where the second intermediate set reflects a second set union combining the discarded similar network endpoint label(s) (found to be substring(s) of any kept/retained encyclopedia article title(s)) and any similar network endpoint label(s) replaced by said kept/retained encyclopedia article title(s). Moreover, in one or more embodiments disclosed herein, the aforementioned origin set may reflect the similar network endpoint label set (extracted in Step 400). In one or more other embodiments disclosed herein, the origin set may alternatively reflect the second similar network endpoint label set (obtained in Step 408).

In Step 424, a determination is made as to whether a cardinality of the third similar network endpoint label set (obtained in Step 422) equals one. That is, in one or more embodiments disclosed herein, if it is determined that the set difference between a first intermediate set and a second intermediate set, where the first intermediate set reflects a first set union combining an origin set (i.e., the similar network endpoint label set (extracted in Step 400) or the second similar network endpoint label set (obtained in Step 408)) and any kept/retained encyclopedia article title(s), where the second intermediate set reflects a second set union combining the discarded similar network endpoint label(s) (found to be substring(s) of any kept/retained encyclopedia article title(s)) and any similar network endpoint label(s) replaced by said kept/retained encyclopedia article title(s), includes a single similar network endpoint label (i.e., cardinality equals one), then the method proceeds to Step 426. On the other hand, in one or more other embodiments disclosed herein, if it is alternatively determined that the set difference between a first intermediate set and a second intermediate set, where the first intermediate set reflects a first set union combining an origin set (i.e., the similar network endpoint label set (extracted in Step 400) or the second similar network endpoint label set (obtained in Step 408)) and any kept/retained encyclopedia article title(s), where the second intermediate set reflects a second set union combining the discarded similar network endpoint label(s) (found to be substring(s) of any kept/retained encyclopedia article title(s)) and any similar network endpoint label(s) replaced by said kept/retained encyclopedia article title(s), includes multiple similar network endpoint labels (i.e., cardinality exceeds one), then the method alternatively proceeds to Step 428.

In Step 426, following the determination (made in Step 424) that a cardinality of the third similar network endpoint label set (obtained in Step 422) equals one, the single similar network endpoint label (i.e., a kept/retained encyclopedia article title) therein is assigned as the de-duplicated network endpoint label for and derived from the given similar network endpoint label tuple.

In Step 428, following the alternative determination (made in Step 420) that none of the similar network endpoint labels, of the similar network endpoint label set (extracted in Step 400) or of the second similar network endpoint label set (obtained in Step 408), are a substring of the encyclopedia article title(s) (identified in Step 416) respective to any other similar network endpoint label(s) thereof, or following the alternative determination (made in Step 424) that a cardinality of the third similar network endpoint label set (obtained in Step 422) exceeds one, a query result set is obtained for the similar network endpoint label set, the second similar network endpoint label set, or the third similar network endpoint label set. That is, in one or more embodiments disclosed herein, the query result set may include a query result respective to each similar network endpoint label of the similar network endpoint label set (extracted in Step 400). In one or more other embodiments disclosed herein, the query result set may include a query result respective to each similar network endpoint label of the second similar network endpoint label set (obtained in Step 408). In yet one or more other embodiments disclosed herein, the query result set may include a query result respective to each similar network endpoint label of the third similar network endpoint label set (obtained in Step 422).

Furthermore, in one or more embodiments disclosed herein, each query result, of the query result set, may have been obtained from a web search engine based data source. Moreover, each query result, of the query result set, may entail listing of world-wide web (WWW) webpages, ranked by relevance to the submitted query (i.e., a similar network endpoint label), along with titles of, universal resource locators (URLs) pointing to, as well as short descriptions summarizing, the webpages, respectively.

In Step 430, from each query result, of the query result set (obtained in Step 428), a webpage title therefrom is identified. In one or more embodiments disclosed herein, the identified webpage title may reference a topmost ranked webpage, by relevance, to the corresponding submitted query (i.e., a similar network endpoint label).

In Step 432, one of the webpage titles (identified in Step 430) is assigned as the de-duplicated network endpoint label for and derived from the given similar network endpoint label tuple. In one or more embodiments disclosed herein, the chosen webpage title may refer to the longer, longest, or most descriptive webpage title amongst the identified webpage titles.

FIGS. 5A-5F show a flowchart describing a method for resolving a de-duplicated network endpoint label set into a unified network endpoint label in accordance with one or more embodiments disclosed herein. The various steps outlined below may be performed by the unified label service operating on the network controller (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Figure 5A:
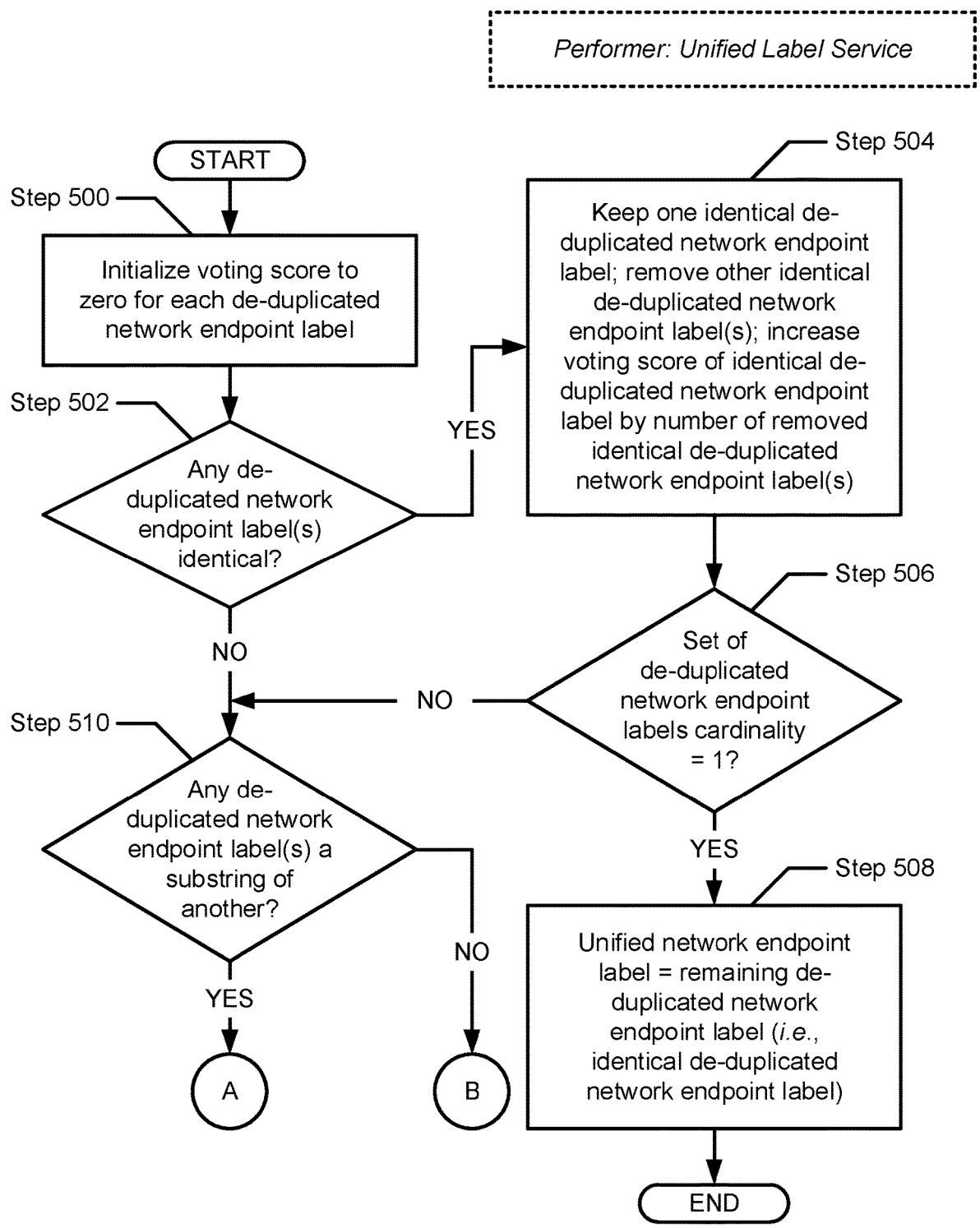
FIGS. 5A-5F show flowcharts describing a method for resolving a de-duplicated network endpoint label set into a unified network endpoint label in accordance with one or more embodiments disclosed herein.

Turning to FIG. 5A, in Step 500, a voting score is initialized (i.e., to zero) for each de-duplicated network endpoint label of the de-duplicated network endpoint label set (obtained in Step 204 of FIG. 2). In one or more embodiments disclosed herein, the voting score, for any given de-duplicated network endpoint label, may represent a numerical value or variable that tracks a number of votes tallied for the given de-duplicated network endpoint label throughout the voting algorithm.

In Step 502, a determination is made as to whether any de-duplicated network endpoint label, of the de-duplicated network endpoint label set (obtained in Step 204 of FIG. 2), is identical to any other de-duplicated network endpoint label(s) thereof. In one or more embodiments disclosed herein, if it is determined that at least one de-duplicated network endpoint label, of the de-duplicated network endpoint label set, is identical to at least one other de-duplicated network endpoint label thereof, then the method proceeds to Step 504. On the other hand, in one or more other embodiments disclosed herein, if it is alternatively determined that none of the de-duplicated network endpoint labels, of the de-duplicated network endpoint label set, are identical to any other de-duplicated network endpoint label(s) thereof, then the method alternatively proceeds to Step 510.

In Step 504, following the determination (made in Step 502) that at least one de-duplicated network endpoint label, of the de-duplicated network endpoint label set (obtained in Step 204 of FIG. 2), is identical to at least one other de-duplicated network endpoint label thereof, one of the identical de-duplicated network endpoint labels, amongst each identified set of identical de-duplicated network endpoint labels, is kept or retained. Meanwhile, in one or more embodiments disclosed herein, any other or duplicate identical de-duplicated network endpoint label(s), amongst each identified set of identical de-duplicated network endpoint labels, is/are discarded. Furthermore, the voting score of any kept/retained identical de-duplicated network endpoint label, amongst each identified set of identical de-duplicated network endpoint labels, may be incremented by the number of discarded identical de-duplicated network endpoint label(s) amongst said identified set of identical de-duplicated network endpoint labels.

For example, consider the de-duplicated network endpoint labels "android os", "zte android", "general mobile phone", "android os", "z667g", and "z667g". In said example, there are two sets of identical de-duplicated network endpoint labels, where one identical de-duplicated network endpoint label in each set may be retained while the other identical de-duplicated network endpoint label in each set may be discarded. The aforementioned removals result in a new set of de-duplicated network endpoint labels that now includes "android os", "zte android", "general mobile phone", and "z667g". Further, a voting score for the kept/retained identical de-duplicated network endpoint label in each identified identical de-duplicated network endpoint label set may increase by one (or the number of discarded identical de-duplicated network endpoint label(s) in each set). Accordingly, any existing voting score for "android os" may be incremented by one, and similarly, any existing voting score for "z667g" may also be incremented by one. By way of another example, if the original de-duplicated network endpoint labels further include another "android os" de-duplicated network endpoint label, then one "android os" (identical) de-duplicated network endpoint label would be kept/retained, while the two other "android os" (identical) de-duplicated network endpoint labels would be discarded. Further, the voting score tied to the kept/retained "android os" (identical) de-duplicated network endpoint label would increase by two (or the number of discarded "android os" (identical) de-duplicated network endpoint labels).

Moreover, in one or more embodiments disclosed herein, in discarding any of the above-mentioned other identical de-duplicated network endpoint label(s), amongst each identified set of identical de-duplicated network endpoint labels, from the de-duplicated network endpoint label set (obtained in Step 204 of FIG. 2), a second de-duplicated network endpoint label set may be obtained. The second de-duplicated network endpoint label set, accordingly, may reflect the set difference between the de-duplicated network endpoint label set and any discarded other identical de-duplicated network endpoint label(s) for each identified set of identical de-duplicated network endpoint labels.

In Step 506, a determination is made as to whether a cardinality of the second de-duplicated network endpoint label set (obtained in Step 504) equals one. That is, in one or more embodiments disclosed herein, if it is determined that the set difference between the de-duplicated network endpoint label set (obtained in Step 204 of FIG. 2) and any discarded other identical de-duplicated network endpoint label(s) for each identified set of identical de-duplicated network endpoint labels, includes a single de-duplicated network endpoint label (i.e., cardinality equals one), then the method proceeds to Step 508. On the other hand, in one or more other embodiments disclosed herein, if it is alternatively determined that the set difference between the de-duplicated network endpoint label set (obtained in Step 204 of FIG. 2) and any discarded other identical de-duplicated network endpoint label(s) for each identified set of identical de-duplicated network endpoint labels, includes multiple de-duplicated network endpoint labels (i.e., cardinality exceeds one), then the method alternatively proceeds to Step 510.

In Step 508, following the determination (made in Step 506) that a cardinality of the second de-duplicated network endpoint label set (obtained in Step 504) equals one, the single de-duplicated network endpoint label (i.e., a kept/retained identical de-duplicated network endpoint label) therein is assigned as the unified network endpoint label for the network endpoint.

In Step 510, following the alternative determination (made in Step 502) that none of the de-duplicated network endpoint labels, of the de-duplicated network endpoint label set (obtained in Step 204 of FIG. 2), are identical to at least one other de-duplicated network endpoint label thereof, or following the alternative determination (made in Step 506) that a cardinality of the second de-duplicated network endpoint label set (obtained in Step 504) exceeds one, a determination is made as to whether any de-duplicated network endpoint label(s), of the de-duplicated network endpoint label set or of the second de-duplicated network endpoint label set, is/are a substring of any other de-duplicated network endpoint label(s) thereof. In one or more embodiments disclosed herein, if it is determined that at least one de-duplicated network endpoint label, of the de-duplicated network endpoint label set or of the second de-duplicated network endpoint label set, is a substring of at least one other de-duplicated network endpoint label thereof, then the method proceeds to 514 (see e.g., FIG. 5B). On the other hand, in one or more other embodiments disclosed herein, if it is alternatively determined that none of the de-duplicated network endpoint labels, of the de-duplicated network endpoint label set or of the second de-duplicated network endpoint label set, are a substring of any other de-duplicated network endpoint label(s) thereof, then the method alternatively proceeds to Step 520 (see e.g., FIG. 5B).

Figure 5B:
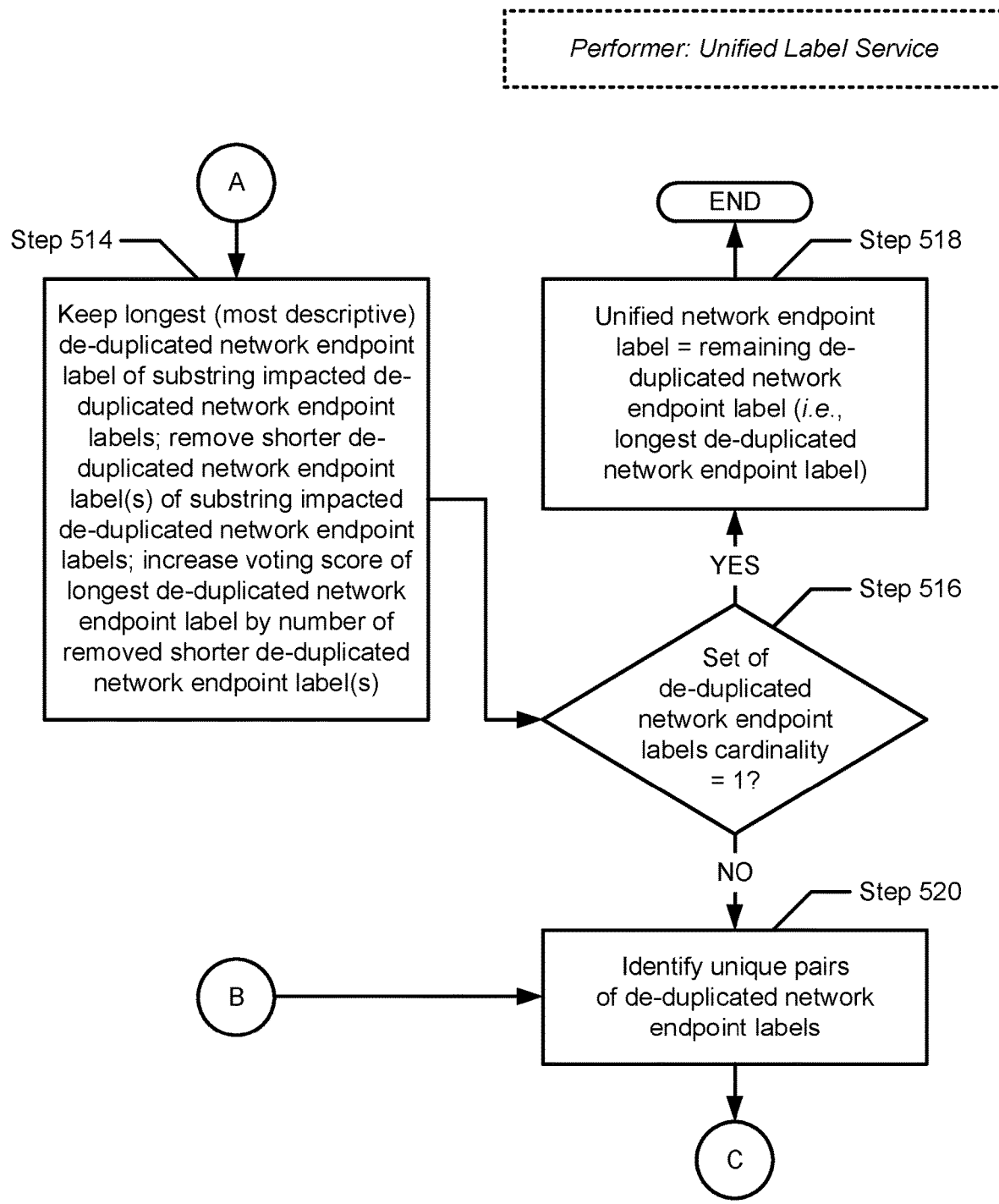

Turning to FIG. 5B, in Step 514, following the determination (made in Step 510) that at least one de-duplicated network endpoint label, of the de-duplicated network endpoint label set (obtained in Step 204 of FIG. 2) or of the second de-duplicated network endpoint label set (obtained in Step 504), is a substring of at least one other de-duplicated network endpoint label thereof, the longer (or longest) (and thus most descriptive) de-duplicated network endpoint label, amongst the substring-impacted de-duplicated network endpoint labels (i.e., the at least one other de-duplicated network endpoint label and the at least one de-duplicated network endpoint label found to be a substring thereof), is kept or retained. Meanwhile, in one or more embodiments disclosed herein, the shorter de-duplicated network endpoint label(s), of the de-duplicated network endpoint label set (or of the second de-duplicated network endpoint label set) and amongst the aforementioned substring-impacted de-duplicated network endpoint labels, is/are discarded. Furthermore, the voting score of any kept/retained longer, longest, or most descriptive de-duplicated network endpoint label, amongst each set of substring-impacted de-duplicated network endpoint labels, may be incremented by the number of discarded shorter de-duplicated network endpoint label(s) amongst said set of substring-impacted de-duplicated network endpoint labels.

For example, when considering the de-duplicated network endpoint labels "linux" and "debian-linux", where the former is a substring of the latter, the longer (or most descriptive) of the two (i.e., "debian-linux") may be retained while the shorter of the two (i.e., "linux") may be discarded. Further, in said example, a voting score for the kept/retained "debian-linux" de-duplicated network endpoint label may increment by one (i.e., enumerating the discarded shorter "linux" de-duplicated network endpoint label). By way of another example, when considering the de-duplicated network endpoint labels "iphone", "iphone 12", and "iphone 12 A2172", where the first and second de-duplicated network endpoint labels are each substrings of the third de-duplicated network endpoint label, the longest (or most descriptive) of the three (i.e., "iphone 12 A2172") may be retained while the shorter de-duplicated network endpoint labels (i.e., "iphone" and "iphone 12") are both discarded. Further, in said example, a voting score for the kept/retained "iphone 12 A2172" de-duplicated network endpoint label may increment by two (i.e., enumerating the discarded shorter "iphone" and "iphone 12" de-duplicated network endpoint labels).

Moreover, in one or more embodiments disclosed herein, in discarding the above-mentioned shorter de-duplicated network endpoint label(s) from the de-duplicated network endpoint label set (obtained in Step 204 of FIG. 2) or from the second de-duplicated network endpoint label set (obtained in Step 504), a third de-duplicated network endpoint label set may be obtained. The third de-duplicated network endpoint label set, accordingly, may reflect the set difference between an origin set and any discarded shorter de-duplicated network endpoint label(s). In one or more embodiments disclosed herein, the aforementioned origin set may refer to the de-duplicated network endpoint label set (obtained in Step 204 of FIG. 2). In one or more other embodiments disclosed herein, the aforementioned origin set may alternatively refer to the second de-duplicated network endpoint label set (obtained in Step 504).

In Step 516, a determination is made as to whether a cardinality of the third de-duplicated network endpoint label set (obtained in Step 514) equals one. That is, in one or more embodiments disclosed herein, if it is determined that the set difference between the de-duplicated network endpoint label set (obtained in Step 204 of FIG. 2) (or the second de-duplicated network endpoint label set (obtained in Step 504)) and the discarded shorter similar network endpoint label(s), includes a single de-duplicated network endpoint label (i.e., cardinality equals one), then the method proceeds to Step 518. On the other hand, in one or more other embodiments disclosed herein, if it is alternatively determined that the set difference between the de-duplicated network endpoint label set (obtained in Step 204 of FIG. 2) (or the second de-duplicated network endpoint label set (obtained in Step 504)) and the discarded shorter similar network endpoint label(s), includes multiple de-duplicated network endpoint labels (i.e., cardinality exceeds one), then the method alternatively proceeds to Step 520.

In Step 518, following the determination (made in Step 516) that a cardinality of the third de-duplicated network endpoint label set (obtained in Step 514) equals one, the single de-duplicated network endpoint label (i.e., the longer/longest, and thus most descriptive, de-duplicated network endpoint label) therein is assigned as the unified network endpoint label for the network endpoint.

In Step 520, following the alternative determination (made in Step 510) that none of the de-duplicated network endpoint labels, of the de-duplicated network endpoint label set (obtained in Step 204 of FIG. 2) or of the second de-duplicated network endpoint label set (obtained in Step 504), are a substring of any other de-duplicated network endpoint label(s) thereof, or following the alternative determination (made in Step 516) that a cardinality of the third de-duplicated network endpoint label set (obtained in Step 514) exceeds one, one or many unique de-duplicated network endpoint label pair(s) is/are identified. In one or more embodiments disclosed herein, each identified unique de-duplicated network endpoint label pair may refer to a different combination of two de-duplicated network endpoint labels, of the aforementioned de-duplicated network endpoint label set, the second de-duplicated network endpoint label set, or the third de-duplicated network endpoint label set. From here, the method proceeds to Step 524 (see e.g., FIG. 5C).

Figure 5C:
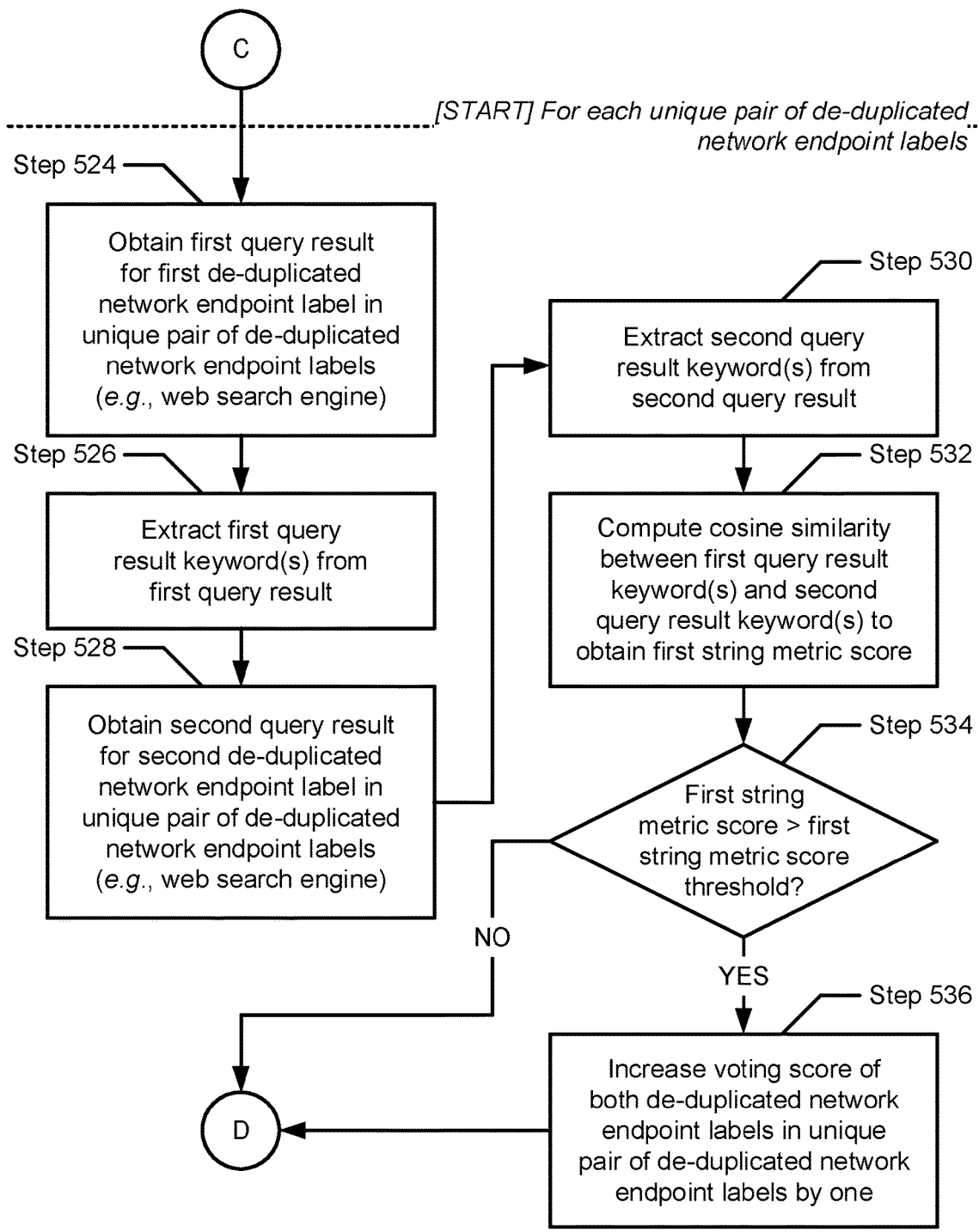

Turning to FIG. 5C, hereinafter, a subset (i.e., Steps 524 through 568) of the remaining various steps may be performed, iteratively as a whole, for each unique de-duplicated network endpoint label pair in the one or many unique de-duplicated network endpoint label pair(s) (identified in Step 520). For example, a first iteration of the aforementioned remaining various steps subset may be performed with respect to a first unique de-duplicated network endpoint label pair; thereafter, a second iteration of the aforementioned remaining various steps subset may be performed with respect to a second unique de-duplicated network endpoint label pair (if any); and so forth, including a last iteration of the aforementioned remaining various steps subset that may be performed with respect to a last unique de-duplicated network endpoint label pair (if any). Furthermore, throughout any given iteration of the aforementioned remaining various steps subset, the unique de-duplicated network endpoint label pair, respective to the given iteration, may be termed or referred to hereinafter as the given unique de-duplicated network endpoint label pair.

In Step 524, a first query result is obtained. In one or more embodiments disclosed herein, the first query result may pertain to a first de-duplicated network endpoint label of the given unique de-duplicated network endpoint label pair. Furthermore, the first query result may have been obtained from a web search engine based data source. Moreover, the first query result may entail a listing of world-wide web (WWW) webpages, ranked by relevance to the submitted query (i.e., the first de-duplicated network endpoint label of the given unique de-duplicated network endpoint label pair), along with titles of, universal resource locators (URLs) pointing to, as well as short descriptions summarizing, the webpages, respectively.

In Step 526, one or many first query result keyword(s) is/are extracted from the first query result (obtained in Step 524). In one or more embodiments disclosed herein, each first query result keyword may refer to one of the most mentioned or relevant text words disclosed in the first query result. Further, extraction of the first query result keyword(s) may entail any known keyword extraction technique or algorithm (e.g., encompassing machine learning and/or artificial intelligence with natural language processing (NLP)).

In Step 528, a second query result is obtained. In one or more embodiments disclosed herein, the second query result may pertain to a second de-duplicated network endpoint label of the given unique de-duplicated network endpoint label pair. Furthermore, the second query result may have been obtained from a web search engine based data source. Moreover, the second query result may entail a listing of world-wide web (WWW) webpages, ranked by relevance to the submitted query (i.e., the second de-duplicated network endpoint label of the given unique de-duplicated network endpoint label pair), along with titles of, universal resource locators (URLs) pointing to, as well as short descriptions summarizing, the webpages, respectively.

In Step 530, one or many second query result keyword(s) is/are extracted from the second query result (obtained in Step 528). In one or more embodiments disclosed herein, each second query result keyword may refer to one of the most mentioned or relevant text words disclosed in the second query result. Further, extraction of the second query result keyword(s) may entail any known keyword extraction technique or algorithm (e.g., encompassing machine learning and/or artificial intelligence with natural language processing (NLP)).

In Step 532, a first string metric score is computed/obtained. In one or more embodiments disclosed herein, the first string metric score may result from the application of a cosine similarity between the first query result keyword(s) (extracted in Step 526) and the second query result keyword(s) (extracted in Step 530). Further, said cosine similarity may refer to a string metric used to quantify or measure how similar sets of character strings are irrespective of their cardinalities or the lengths of the keywords themselves.

In Step 534, a determination is made as to whether the first string metric score (computed/obtained in Step 532) exceeds a first string metric score threshold. Accordingly, in one or more embodiments disclosed herein, if it is determined that the first string metric score exceeds the first string metric score threshold, then the method proceeds to Step 536. On the other hand, in one or more other embodiments disclosed herein, if it is alternatively determined that the first string metric score falls short or meets the first string metric score threshold, then the method alternatively proceeds to Step 540 (see e.g., FIG. 5D).

In Step 536, following the determination (made in Step 534) that the first string metric score (computed/obtained in Step 532) exceeds the first string metric score threshold, a voting score for each of the first and second de-duplicated network endpoint labels, of the given unique de-duplicated network endpoint label pair, is incremented by one. From here, the method proceeds to Step 540 (see e.g., FIG. 5D).

Figure 5D:
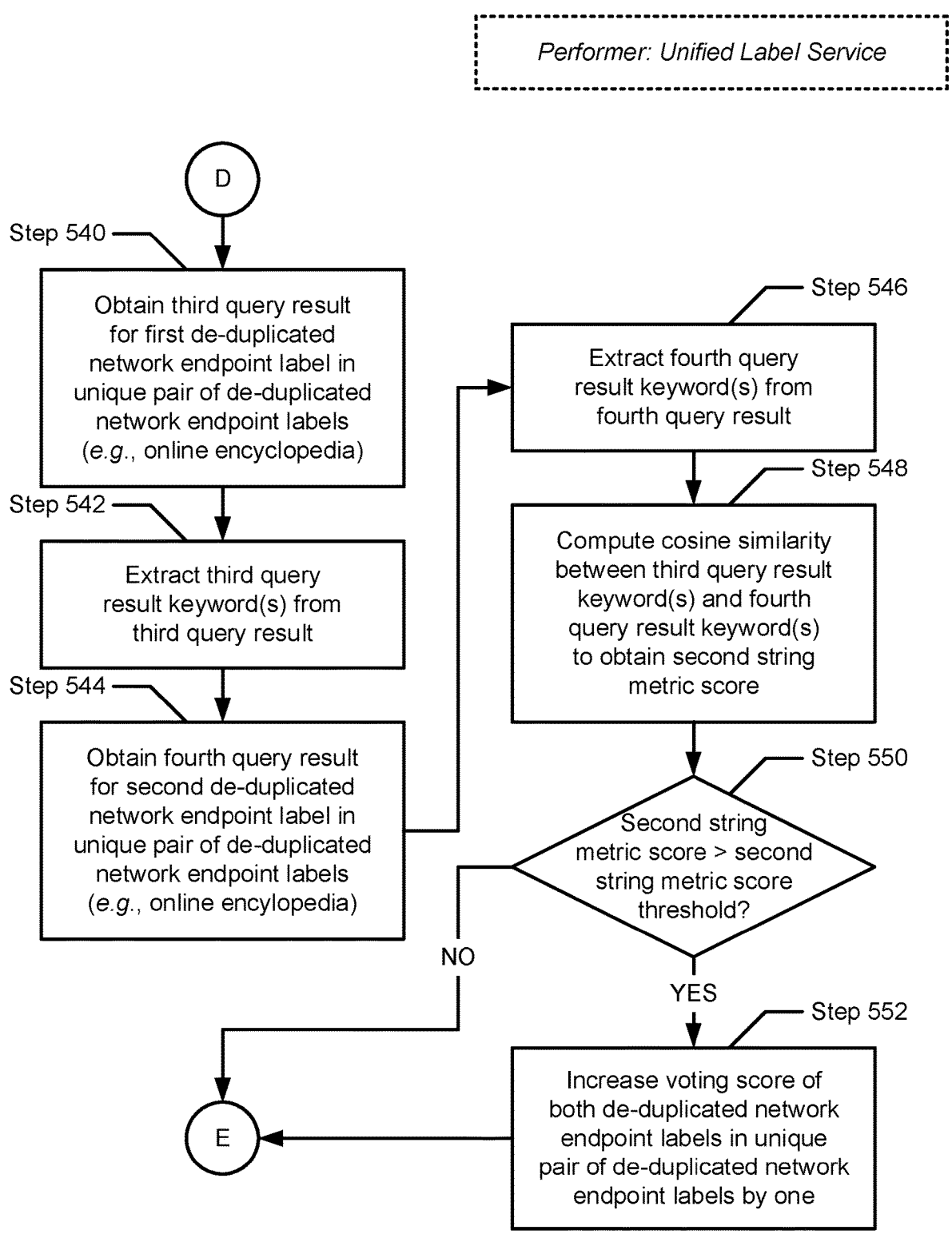

Turning to FIG. 5D, in Step 540, a third query result is obtained. In one or more embodiments disclosed herein, the third query result may pertain to the first de-duplicated network endpoint label of the given unique de-duplicated network endpoint label pair. Furthermore, the third query result may have been obtained from an online encyclopedia based data source. Moreover, the third query result may entail a listing of encyclopedia articles, also ranked by relevance to the submitted query (i.e., the first de-duplicated network endpoint label of the given unique de-duplicated network endpoint label pair), along with titles of, URLs pointing to, and short descriptions summarizing, the articles, respectively.

In Step 542, one or many third query result keyword(s) is/are extracted from the third query result (obtained in Step 540). In one or more embodiments disclosed herein, each third query result keyword may refer to one of the most mentioned or relevant text words disclosed in the third query result. Further, extraction of the third query result keyword(s) may entail any known keyword extraction technique or algorithm (e.g., encompassing machine learning and/or artificial intelligence with natural language processing (NLP)).

In Step 544, a fourth query result is obtained. In one or more embodiments disclosed herein, the fourth query result may pertain to a second de-duplicated network endpoint label of the given unique de-duplicated network endpoint label pair. Furthermore, the fourth query result may have been obtained from an online encyclopedia based data source. Moreover, the fourth query result may entail a listing of encyclopedia articles, also ranked by relevance to the submitted query (i.e., the second de-duplicated network endpoint label of the given unique de-duplicated network endpoint label pair), along with titles of, URLs pointing to, and short descriptions summarizing, the articles, respectively.

In Step 546, one or many fourth query result keyword(s) is/are extracted from the fourth query result (obtained in Step 544). In one or more embodiments disclosed herein, each fourth query result keyword may refer to one of the most mentioned or relevant text words disclosed in the fourth query result. Further, extraction of the fourth query result keyword(s) may entail any known keyword extraction technique or algorithm (e.g., encompassing machine learning and/or artificial intelligence with natural language processing (NLP)).

In Step 548, a second string metric score is computed/obtained. In one or more embodiments disclosed herein, the second string metric score may result from the application of a cosine similarity between the third query result keyword(s) (extracted in Step 542) and the fourth query result keyword(s) (extracted in Step 546). Further, said cosine similarity may refer to a string metric used to quantify or measure how similar sets of character strings are irrespective of their cardinalities or the lengths of the keywords themselves.

In Step 550, a determination is made as to whether the second string metric score (computed/obtained in Step 548) exceeds a second string metric score threshold. Accordingly, in one or more embodiments disclosed herein, if it is determined that the second string metric score exceeds the second string metric score threshold, then the method proceeds to Step 552. On the other hand, in one or more other embodiments disclosed herein, if it is alternatively determined that the second string metric score falls short or meets the second string metric score threshold, then the method alternatively proceeds to Step 556 (see e.g., FIG. 5E).

In Step 552, following the determination (made in Step 550) that the second string metric score (computed/obtained in Step 548) exceeds the second string metric score threshold, a voting score for each of the first and second de-duplicated network endpoint labels, of the given unique de-duplicated network endpoint label pair, is incremented by one. From here, the method proceeds to Step 556 (see e.g., FIG. 5E).

Figure 5E:
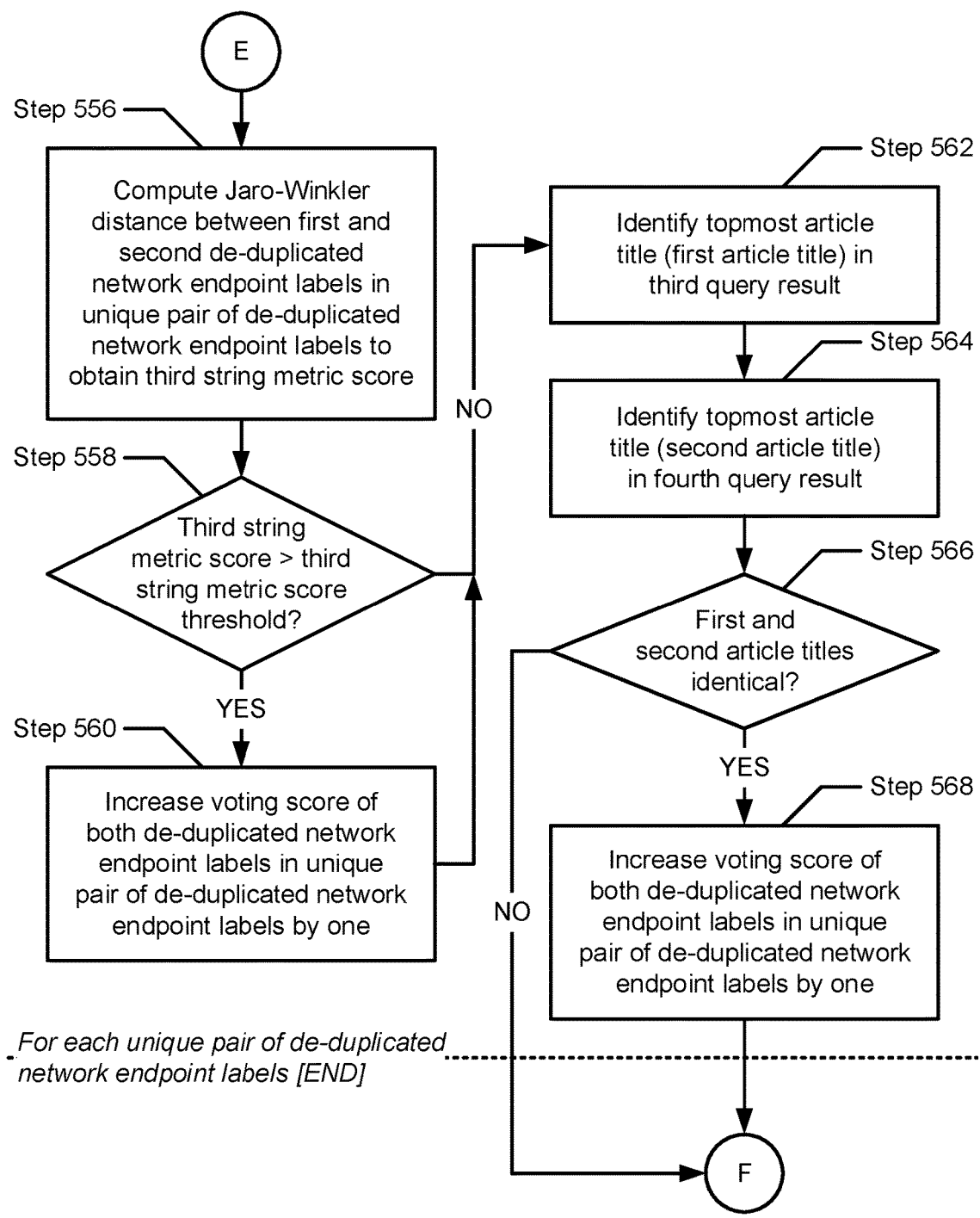

Turning to FIG. 5E, in Step 556, a third string metric score is computed/obtained. In one or more embodiments disclosed herein, the third string metric score may result from the measurement of a Jaro-Winkler distance between the first and second de-duplicated network endpoint labels of the given unique de-duplicated network endpoint label pair. Further, said Jaro-Winkler distance may refer to a string metric used to quantify or measure how an edit distance between character strings, where the edit distance refers to quantifying how dissimilar two character strings may be to one another by way of counting the minimum number of operations required to transform one character string into the other.

In Step 558, a determination is made as to whether the third string metric score (computed/obtained in Step 556) exceeds a third string metric score threshold. Accordingly, in one or more embodiments disclosed herein, if it is determined that the third string metric score exceeds the third string metric score threshold, then the method proceeds to Step 560. On the other hand, in one or more other embodiments disclosed herein, if it is alternatively determined that the third string metric score falls short or meets the third string metric score threshold, then the method alternatively proceeds to Step 562.

In Step 560, following the determination (made in Step 558) that the third string metric score (computed/obtained in Step 556) exceeds the third string metric score threshold, a voting score for each of the first and second de-duplicated network endpoint labels, of the given unique de-duplicated network endpoint label pair, is incremented by one. From here, the method proceeds to Step 562.

In Step 562, following the alternative determination (made in Step 558) that the third string metric score falls short or meets the third string metric score threshold, or following the voting score increase (performed in Step 560), a first online encyclopedia article title is identified. In one or more embodiments disclosed herein, the first online encyclopedia article title may represent a topmost ranked encyclopedia article, by reference, in a listing of encyclopedia articles inferred for the first de-duplicated network endpoint label of the given unique de-duplicated network endpoint label pair. Further, the aforementioned listing of encyclopedia articles, including a first encyclopedia article associated with the first online encyclopedia article title, may be identified from the third query result (obtained in Step 540).

In Step 564, a second online encyclopedia article title is identified. In one or more embodiments disclosed herein, the second online encyclopedia article title may represent a topmost ranked encyclopedia article, by reference, in a listing of encyclopedia articles inferred for the second de-duplicated network endpoint label of the given unique de-duplicated network endpoint label pair. Further, the aforementioned listing of encyclopedia articles, including a second encyclopedia article associated with the second online encyclopedia article title, may be identified from the fourth query result (obtained in Step 544).

In Step 566, a determination is made as to whether the first online encyclopedia article title (identified in Step 562) and the second online encyclopedia article title (identified in Step 564) are identical. In one or more embodiments disclosed herein, if it is determined that the first and second online article titles are identical, and thus reference a same or common online encyclopedia article, then the method proceeds to Step 568. On the other hand, in one or more other embodiments disclosed herein, if it is alternatively determined that the first and second online article titles are not identical, and thus each reference a different online encyclopedia article, then the method alternatively proceeds to Step 572 (see e.g., FIG. 5F).

In Step 568, following the determination (made in Step 566) that the first online encyclopedia article title (identified in Step 562) and the second online encyclopedia article title (identified in Step 564) are identical, a voting score for each of the first and second de-duplicated network endpoint labels, of the given unique de-duplicated network endpoint label pair, is incremented by one. From here, the method proceeds to Step 572 (see e.g., FIG. 5F).

Figure 5F:
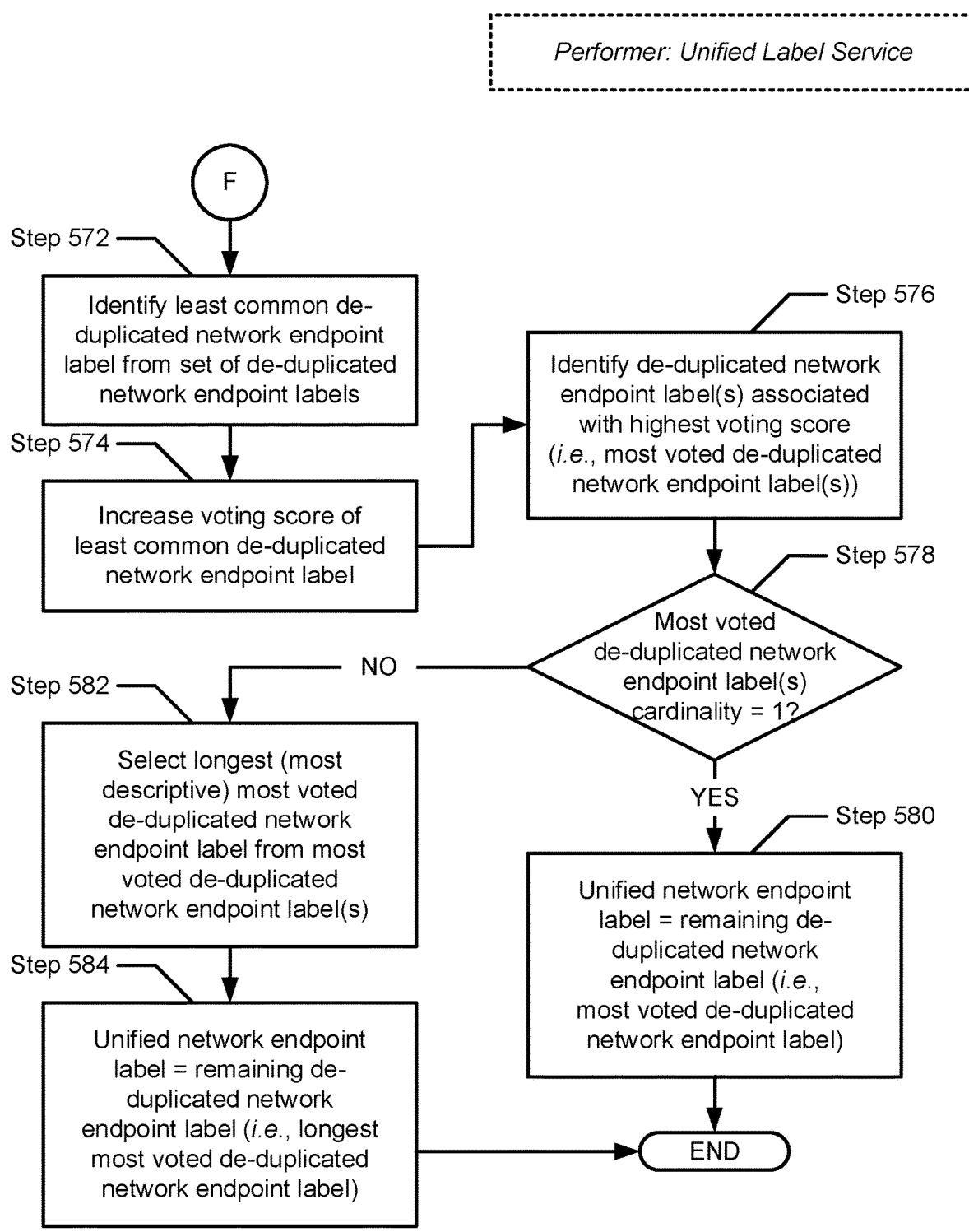

Turning to FIG. 5F, in Step 572, following the performance of the above-mentioned remaining various steps subset (i.e., Steps 524 through 568) for each unique de-duplicated network endpoint label pair in the one or many unique de-duplicated network endpoint label pair(s) (identified in Step 520), a least common de-duplicated network endpoint label, of the de-duplicated network endpoint label set (obtained in Step 204 of FIG. 2), the second de-duplicated network endpoint label set (obtained in Step 504), or the third de-duplicated network endpoint label set (obtained in Step 514), is identified. In one or more embodiments disclosed herein, the least common de-duplicated network endpoint label may represent a most exclusive, and thus more specific and better describing, de-duplicated network endpoint label amongst the contending de-duplicated network endpoint labels.

In Step 574, a voting score, for the least common de-duplicated network endpoint label (identified in Step 572), is incremented by one.

In Step 576, one or many de-duplicated network endpoint label(s) is/are identified. In one or more embodiments disclosed herein, the identified de-duplicated network endpoint label(s) may stem from the de-duplicated network endpoint label set (obtained in Step 204 of FIG. 2). In one or more other embodiments disclosed herein, the identified de-duplicated network endpoint label(s) may stem from the second de-duplicated network endpoint label set (obtained in Step 504). In one or more other embodiments still disclosed herein, the identified de-duplicated network endpoint label(s) may stem from the third de-duplicated network endpoint label set (obtained in Step 514). Furthermore, the identified de-duplicated network endpoint label(s) may each be associated with the highest voting score tallied amongst the contending de-duplicated network endpoint labels. Accordingly, each identified de-duplicated network endpoint label may also be referred to hereinafter as a most voted de-duplicated network endpoint label.

In Step 578, a determination is made as to whether a cardinality of the most voted de-duplicated network endpoint label(s) (identified in Step 576) equals one. That is, in one or more embodiments disclosed herein, if it is determined that the identified most voted de-duplicated network endpoint label(s) includes a single most voted de-duplicated network endpoint label (i.e., cardinality equals one), then the method proceeds to Step 580. On the other hand, in one or more other embodiments disclosed herein, if it is alternatively determined that the identified most voted de-duplicated network endpoint label(s) includes multiple most voted de-duplicated network endpoint labels (i.e., cardinality exceeds one), then the method alternatively proceeds to Step 582.

In Step 580, following the determination (made in Step 578) that a cardinality of the most voted de-duplicated network endpoint label(s) (identified in Step 576) equals one, the single most voted de-duplicated network endpoint label therein is assigned as the unified network endpoint label for the network endpoint.

In Step 582, following the alternative determination (made in Step 578) that a cardinality of the most voted de-duplicated network endpoint label(s) (identified in Step 576) exceeds one, one of said multiple most voted de-duplicated network endpoint labels therein is selected. In one or more embodiments disclosed herein, the aforementioned selection may entail choosing a most voted de-duplicated network endpoint label, amongst the contending multiple most voted de-duplicated network endpoint labels, through randomization. In one or more other embodiments disclosed herein, the aforementioned selection may alternatively entail choosing a longest (and thus a most descriptive) most voted de-duplicated network endpoint label, amongst the contending multiple most voted de-duplicated network endpoint labels.

In Step 584, the most voted de-duplicated network endpoint label (selected in Step 582), from amongst the contending multiple most voted de-duplicated network endpoint labels (identified in Step 576), is assigned as the unified network endpoint label for the network endpoint.

Figure 6:
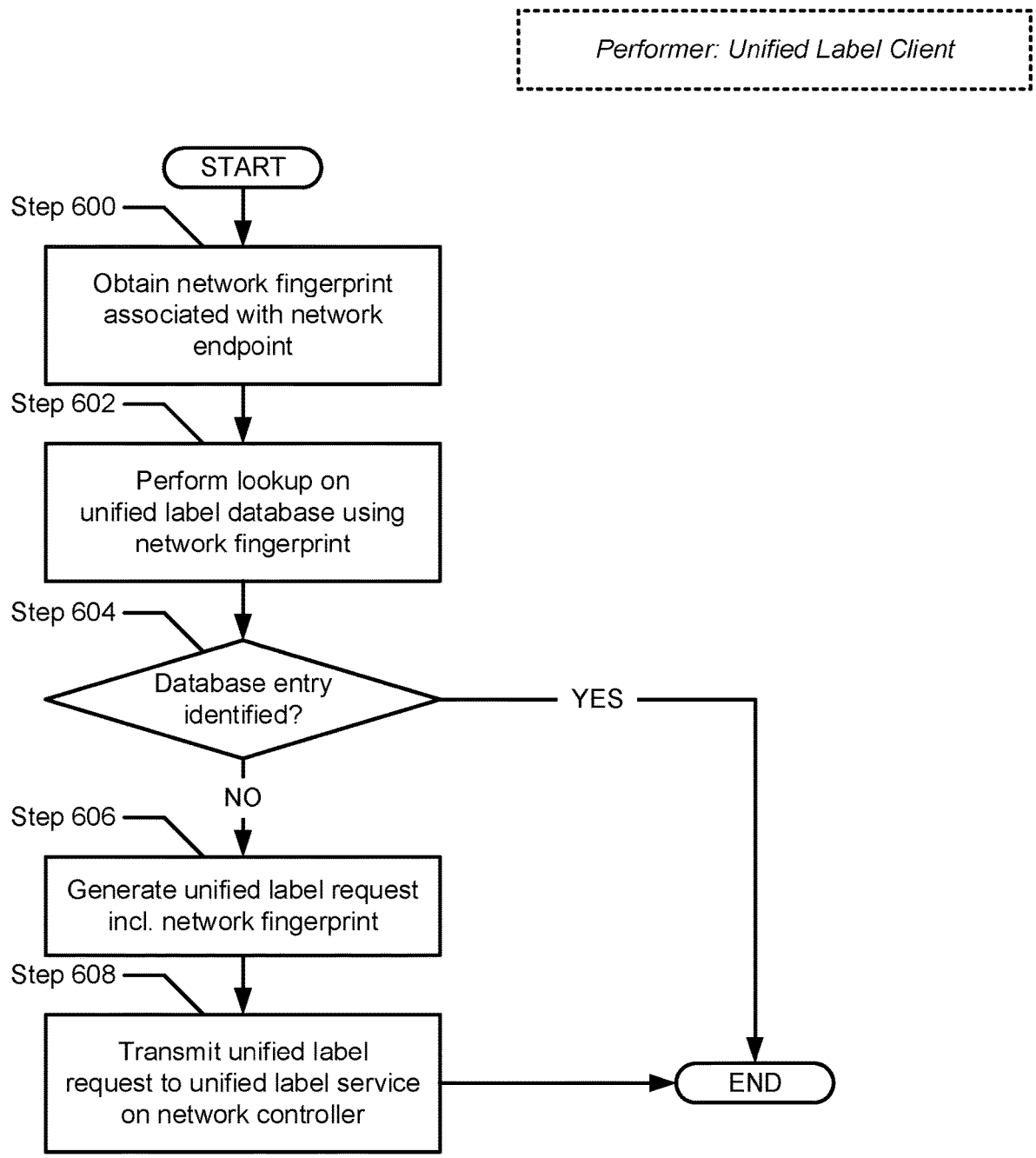
FIG. 6 shows a flowchart describing a method for unified label request transmittal in accordance with one or more embodiments disclosed herein.

FIG. 6 shows a flowchart describing a method for unified label request transmittal in accordance with one or more embodiments disclosed herein. The various steps outlined below may be performed by, for example, any unified label client operating on any host leaf device (see e.g., FIG. 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a network fingerprint is obtained. In one or more embodiments disclosed herein, the network fingerprint may be associated with, and thus reflect information descriptive of hardware, software, and/or firmware respective to or operating on, a network endpoint. Further, the network fingerprint may be extracted from a network packet sourced from the network endpoint.

In Step 602, a lookup is performed on a unified label database (see e.g., FIG. 1C), on the hosted leaf device, using the network fingerprint (obtained in Step 600). In one or more embodiments disclosed herein, the unified label database may include one or many database entry (entries) each storing a network fingerprint to a unified network endpoint label mapping.

In Step 604, a determination is made as to whether the lookup (performed in Step 602) resulted in the identification of an existing database entry of the unified label database. An existing database entry, if identified, may at least include the network fingerprint (obtained in Step 600) therein. Accordingly, in one or more embodiments disclosed herein, if it is determined that an existing database entry has been identified, then the method ends. On the other hand, in one or more other embodiments disclosed herein, if it is alternatively determined that none of the existing database entry (entries) has/have been identified, then the method alternatively proceeds to Step 606.

In Step 606, following the alternative determination (made in Step 604) that no existing database entry (entries) has/have been identified as a result of the lookup (performed in Step 602), a unified label request is generated. In one or more embodiments disclosed herein, the unified label request may include the network fingerprint (obtained in Step 600).

In Step 608, the unified label request (generated in Step 606) is transmitted to a unified label service operating on a network controller (see e.g., FIG. 1B). In one or more embodiments disclosed herein, the unified label service may subsequently subject the submitted network fingerprint to network endpoint identification through network fingerprint based entity resolution, as outlined with respect to FIGS. 2-5F, above.

Figure 7:
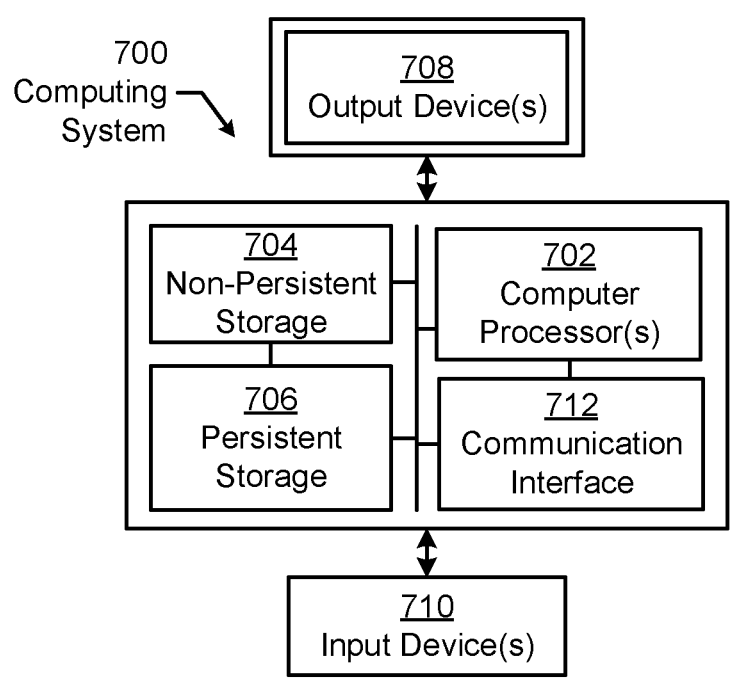
FIG. 7 shows an exemplary computing system in accordance with one or more embodiments disclosed herein.

FIG. 7 shows an exemplary computing system in accordance with one or more embodiments disclosed herein. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one or more embodiments disclosed herein, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one or more embodiments disclosed herein, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform one or more embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

FIGS. 8A-8G show an exemplary scenario in accordance with one or more embodiments disclosed herein. The following exemplary scenario, presented in conjunction with components shown in FIGS. 8A-8G, is for explanatory purposes only and not intended to limit the scope of the disclosure.

Figure 8A:
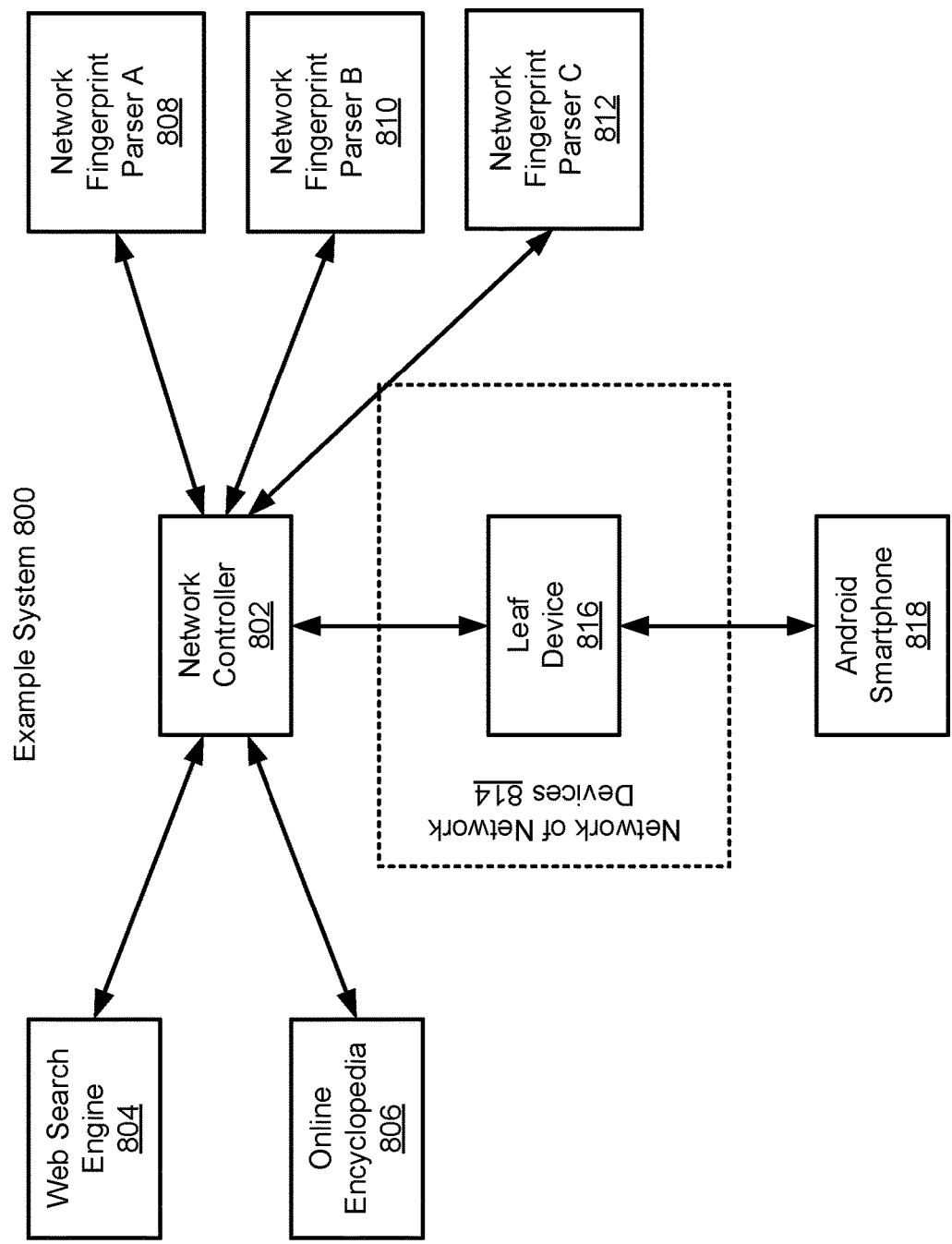
FIGS. 8A-8G show an exemplary scenario in accordance with one or more embodiments disclosed herein.

Turning to FIG. 8A, an example system (100) is illustrated. The example system (100) may include a network controller (802), a web search engine (804) representing a first data source, an online encyclopedia (806) representing a second data source, three different network fingerprint parsers (808, 810, 812), a network of network devices (814) entailing at least a leaf device (816), and an android smartphone (818) representing a network endpoint.

Figure 8B:
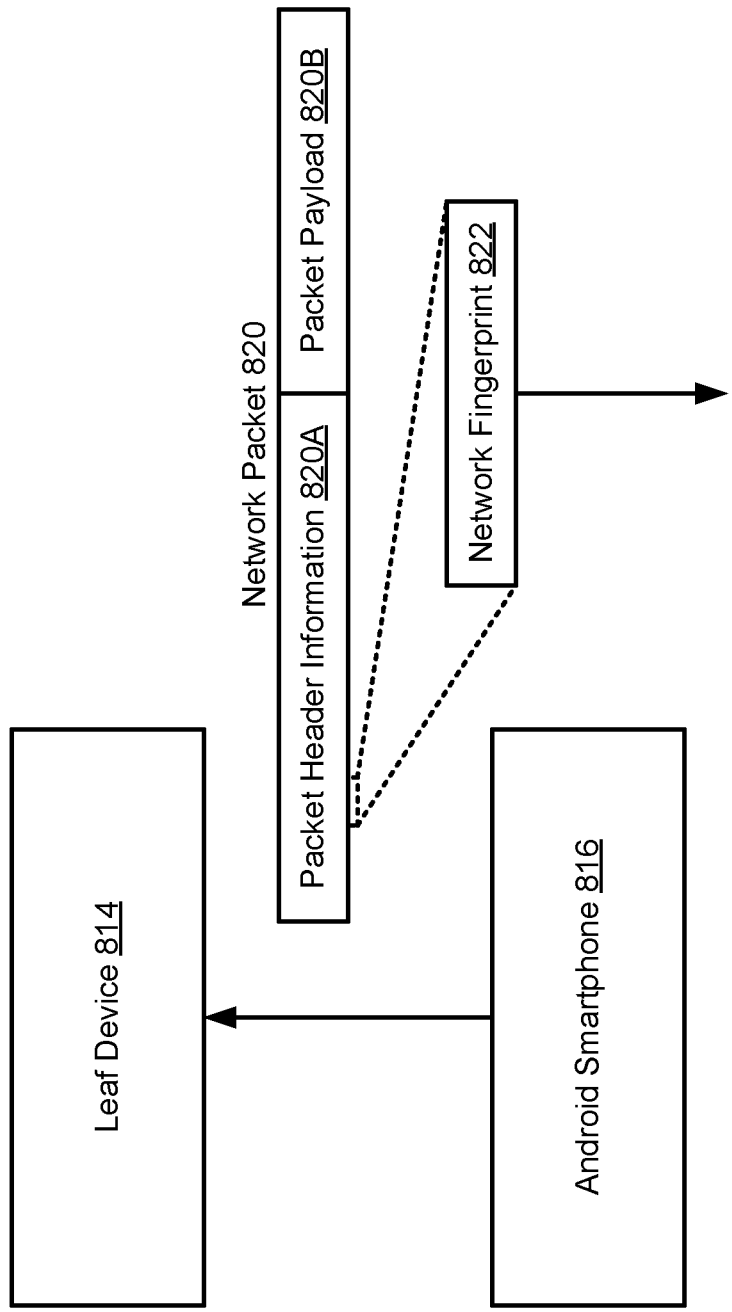

Turning to FIG. 8B, the exemplary scenario begins with the transmission of a network packet (820) by the android smartphone (816). The network packet (820) may represent one of one or many network packet(s) (i.e., a series of network packets) (not shown) directed to a network service by a network client operating on the android smartphone (816), or directed to communications with one or many other network endpoint(s) (not shown). Further, the network packet (820) may at least include packet header information (820A) and a packet payload (820B). Within the packet header information (820A), a network fingerprint (822) associated with the android smartphone (816) (and generated by a user agent thereon) may be embedded. The network fingerprint (822) represents a brief character string compacting various information descriptive of hardware, software, and/or firmware respective to or operating on the android smartphone (816).

Figure 8C:
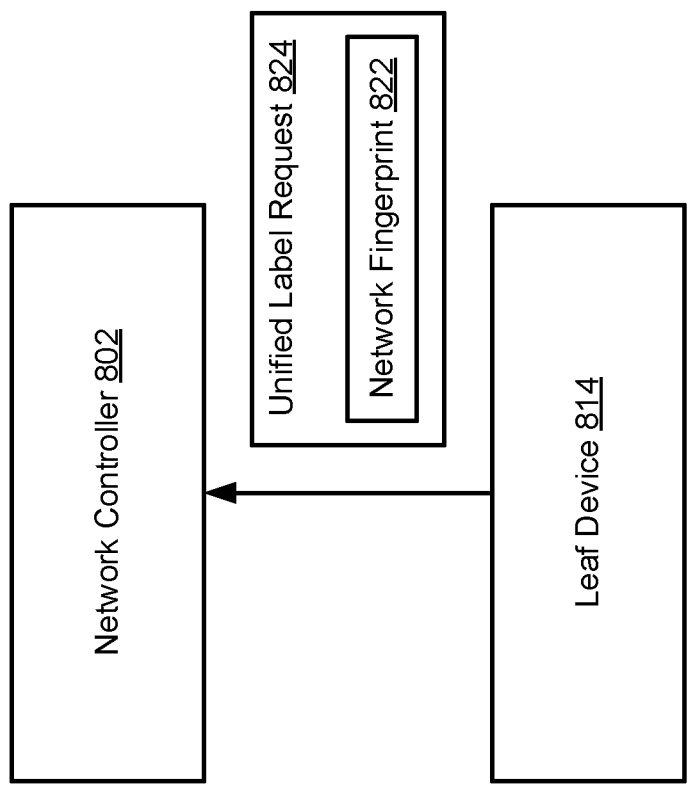

Turning to FIG. 8C, serving as the first next hop in the network path(s), through the network of network devices (814) or at least a portion thereof, leading to one or many destination(s) of the network packet (820), the leaf device (814), directly connected to the android smartphone (816) either through a wired or wireless connection, receives the network packet (820). The leaf device (814) subsequently extracts the network fingerprint (822) from the network packet (820) and determines that the network fingerprint (822) is not specified within any existing database entries of a local unified label database (not shown) implemented on the leaf device (814). Based on said determination, the leaf device (814) generates a unified label request (824), including the network fingerprint (822), and transmits the unified label request (824), through the network of network devices (812) (or at least a portion thereof), towards the network controller (802).

Figure 8D:
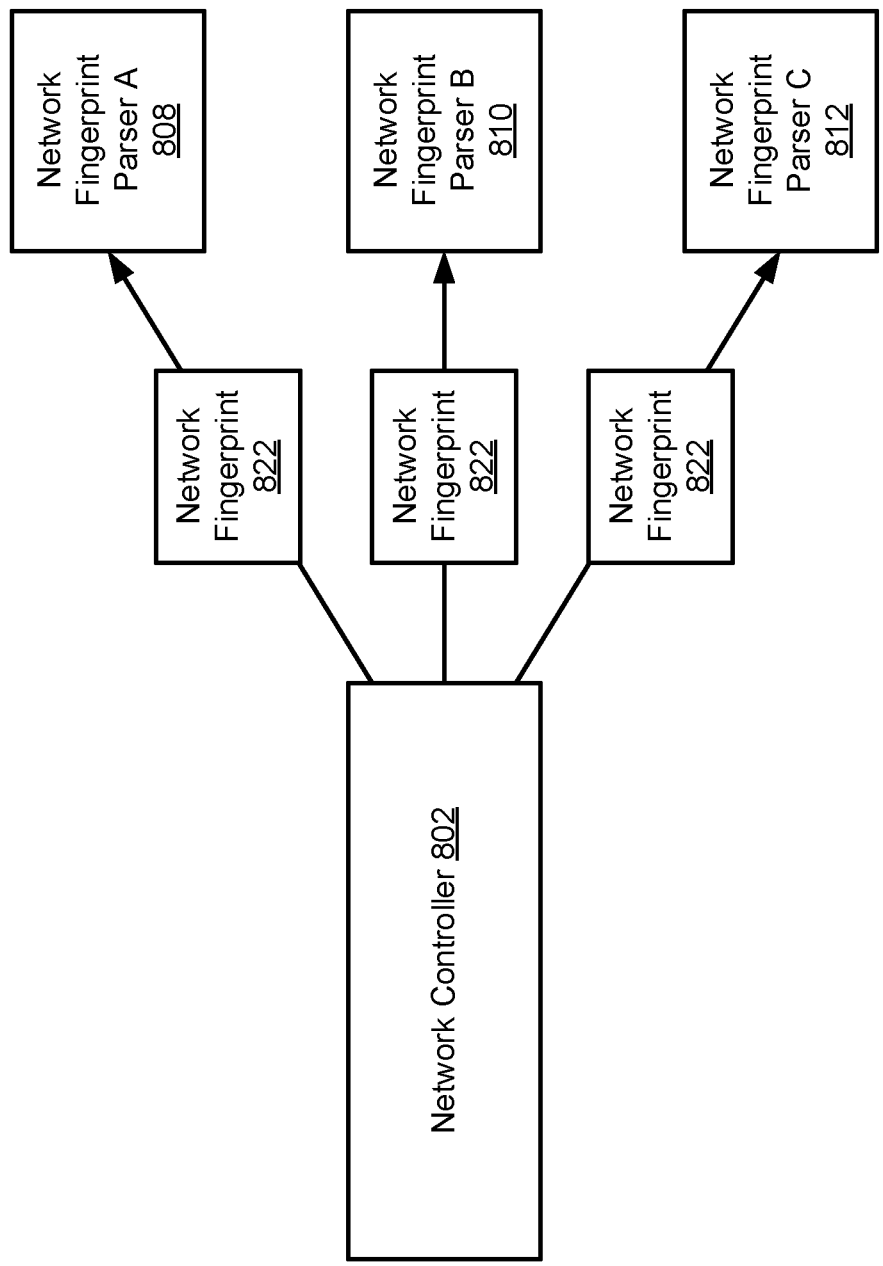

Turning to FIG. 8D, the network controller (802) receives the above-mentioned unified label request (824), and extracts the network fingerprint (822) therefrom. The network controller (802) then proceeds to submit the network fingerprint (822) to each of the three different network fingerprint parsers (808, 810, 812).

Figure 8E:
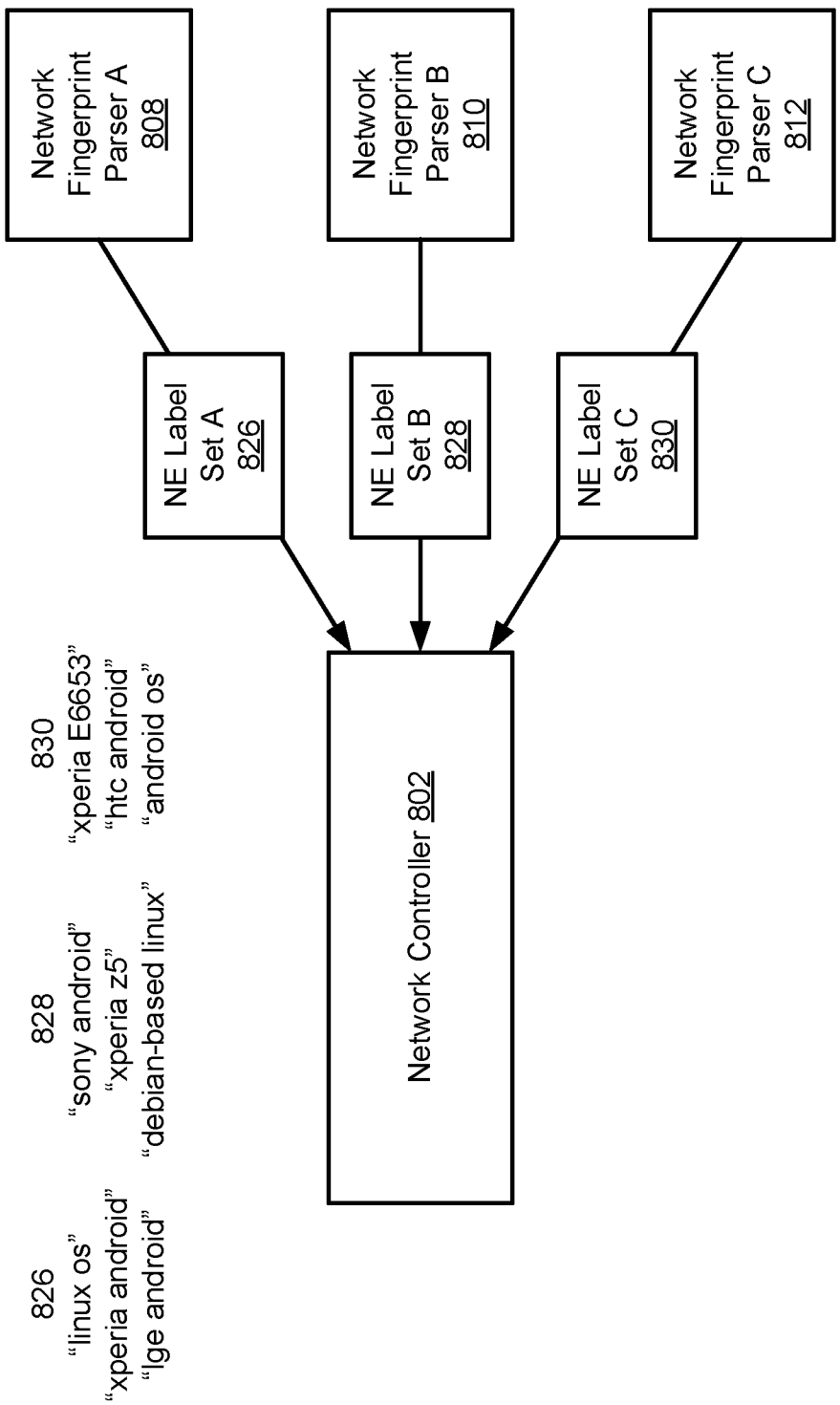

Turning to FIG. 8E, each different network fingerprint parser (808, 810, 812) responds back to the network controller (802) using a respective network endpoint label set (826, 828, 830). The first network endpoint label set (826), obtained from the first network fingerprint parser (808), includes the network endpoint labels "linux os", "xperia android", and "lge android". Further, the second endpoint label set (828), obtained from the second network fingerprint parser (810), includes the network endpoint labels "sony android", "xperia z5", "debian-based linux". Moreover, the third network endpoint label set (830), obtained from the third network fingerprint parser (812), includes the network endpoint labels "xperia E6653", "htc android", and "android os". Each network endpoint label, from any network endpoint label set (826, 828, 830), may reference an entity inferred by the corresponding network fingerprint parser (808, 810, 812) based on the submitted network fingerprint (822) thereto.

Figure 8F:
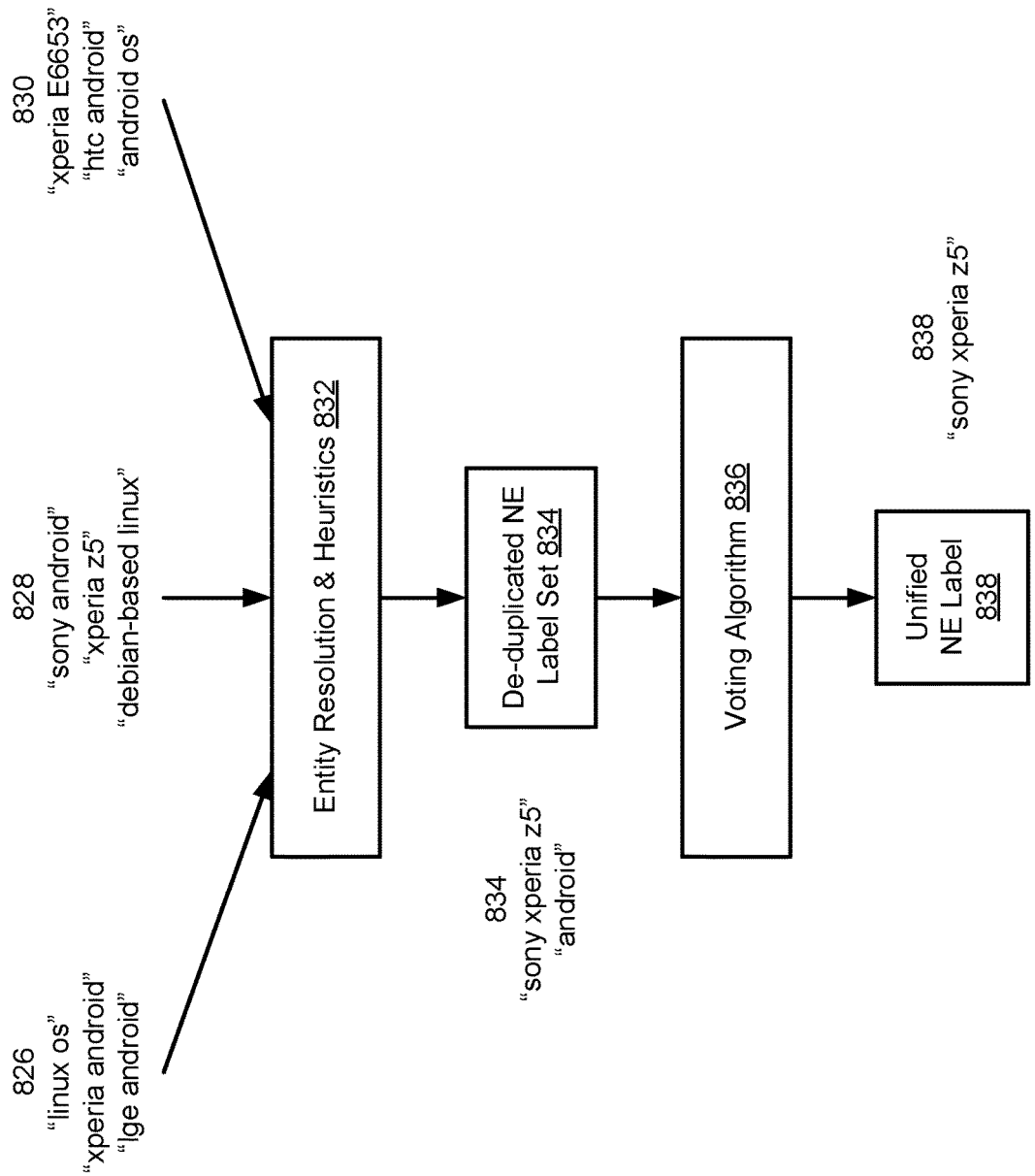

Turning to FIG. 8F, on the network controller (802), entity resolution and heuristics (832) are applied to the three received network endpoint label sets (826, 828, 830), which produces a de-duplicated network endpoint label set (834). Said application of entity resolution and heuristics (832) follow the various steps outlined and described with respect to FIGS. 3-4B, above, in accordance with one or more embodiments disclosed herein. The de-duplicated network endpoint label set (834) includes the de-duplicated network endpoint labels "sony xperia z5" and "android". Afterwards, a voting algorithm (836) is applied to the produced de-duplicated network endpoint label set (834), which renders a unified network endpoint label (838). Said application of the voting algorithm (836) follows the various steps outlined and described with respect to FIGS. 5A-5F, above, in accordance with one or more embodiments disclosed herein. Furthermore, the unified network endpoint label (838) reflects that the android smartphone (818) is best described or identified by the label "sony xperia z5".

Figure 8G:
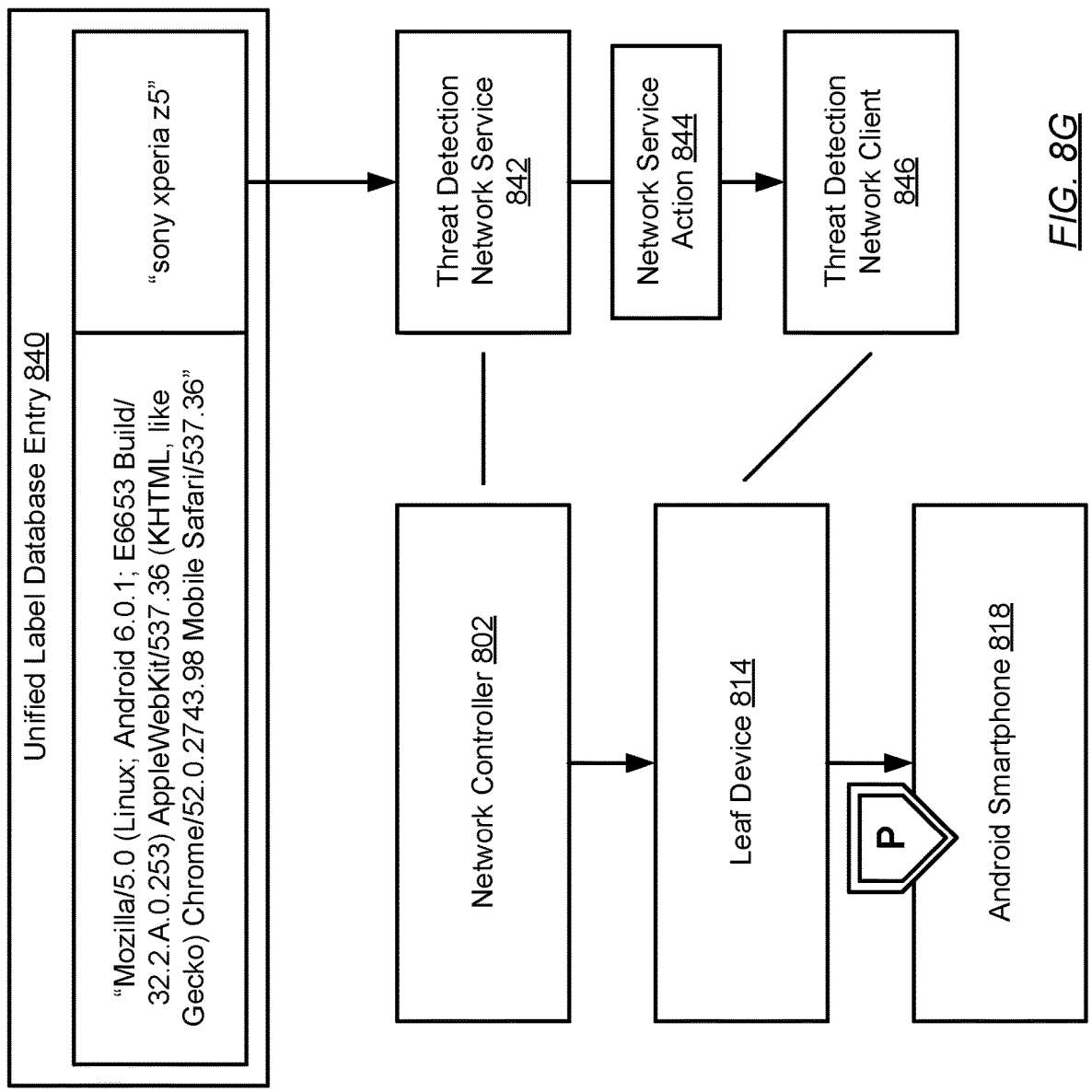

Turning to FIG. 8G, on the network controller (802), the network fingerprint (822) and the unified network endpoint label (838) are used to generate a new unified label database entry (840). The new unified label database entry (840) is then used to update a master unified label database (not shown) on the network controller (802). This update is then filtered through to any local unified label database(s) implemented on one, each, or many leaf device(s), including the leaf device (814) via a publish-subscribe architecture associated with the master unified label database. From here, at least the rendered unified network endpoint label (838) is subsequently shared with at least a threat detection network service (842) residing on the network controller (802). The threat detection network service (842) then uses the shared unified network endpoint label (838) to tune, adjust, or calibrate offered services directed to cyber-security threat detection and response (or aspects thereof) to the "sony xperia z5" labeled android smartphone (818). These tuned, adjusted, or calibrated services (or aspects thereof) are communicated as a network service action (844) to be implemented on a threat detection network client (846) operating on the leaf device (814). On the leaf device (814) and by the threat detection network client (846), the network service action (844) may be implemented as part of one or many construct(s) (e.g., data structures, policies, rules, etc.) programmed thereon, which the leaf device (814) (or more specifically, a network processor (not shown) thereon) uses to permit or deny network traffic destined to the android smartphone (818). Accordingly, protection from malicious activities directed to the android smartphone (818) may be tailored based, at least in part, on the unified network endpoint label (838) inferred from the network fingerprint (822) associated therewith.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for network endpoint identification, the method comprising:
receiving a unified label request comprising a network fingerprint associated with a network endpoint;
obtaining, from each network fingerprint parser in a plurality of network fingerprint parsers, a network endpoint label set inferred from the network fingerprint to obtain a plurality of network endpoint label sets;
reducing the plurality of network endpoint label sets to obtain a de-duplicated network endpoint label set; and
resolving the de-duplicated network endpoint label set to obtain a unified network endpoint label identifying the network endpoint.

2. The method of claim 1, wherein the network fingerprint comprises a character string generated by a user agent operating on the network endpoint.

3. The method of claim 1, wherein to reduce the plurality of network endpoint label sets to obtain the de-duplicated network endpoint label set, the method further comprises:
applying entity resolution onto the plurality of network endpoint label sets to identify a similar network endpoint label tuple set; and
merging the similar network endpoint label tuple set to obtain the de-duplicated network endpoint label set.

4. The method of claim 3, wherein each similar network endpoint label tuple in the similar network endpoint label tuple set comprises a network endpoint label inferred from a different network fingerprint parser in a plurality of network fingerprint parsers, wherein the network endpoint label of each different network fingerprint parser references a similar entity.

5. The method of claim 3, the method further comprising:
prior to applying entity resolution onto the plurality of network endpoint label sets to identify the similar network endpoint label tuple set:
for each network endpoint label throughout the plurality of network endpoint label sets:
extracting a network endpoint label keyword from the network endpoint label;
obtaining, from each data source in a plurality of data sources, a query result inferred from the network endpoint label to obtain a plurality of query results;
extracting, from each query result in the plurality of query results, a query result keyword to obtain a plurality of query result keywords; and
forming, respective to the network endpoint label, a network endpoint label field set comprising the network endpoint label, the network endpoint label keyword, and the plurality of query result keywords,
wherein each similar network endpoint label tuple in the similar network endpoint label tuple set is identified, at least in part, based on similarities between the network endpoint label field set for each network endpoint label.

6. The method of claim 5, wherein the similarities are quantified using string similarity metrics.

7. He method of claim 5, wherein the plurality of data sources comprises a web search engine and an online encyclopedia.

8. The method of claim 3, wherein to merge the similar network endpoint label tuple set to obtain the de-duplicated network endpoint label set, the method further comprises:
for each similar network endpoint label tuple in the similar network endpoint label tuple set:
extracting a plurality of similar network endpoint labels from the similar network endpoint label tuple;
making a determination that the plurality of similar network endpoint labels are identical; and
assigning, based on the determination, a similar network endpoint label in the plurality of similar network endpoint labels as a de-duplicated network endpoint label for the similar network endpoint label tuple,
wherein the de-duplicated network endpoint label set comprises the de-duplicated network endpoint label for each similar network endpoint label tuple in the similar network endpoint label tuple set.

9. The method of claim 3, wherein to merge the similar network endpoint label tuple set to obtain the de-duplicated network endpoint label set, the method further comprises:
for each similar network endpoint label tuple in the similar network endpoint label tuple set:
extracting a plurality of similar network endpoint labels from the similar network endpoint label tuple;
making a first determination that the plurality of similar network endpoint labels are not identical;
making a second determination, based on the first determination, that a shorter similar network endpoint label is a substring of a longer similar network endpoint label; and
based on the second determination:
keeping the longer similar network endpoint label; and
discarding the shorter similar network endpoint label.

10. The method of claim 9, wherein to merge the similar network endpoint label tuple set to obtain the de-duplicated network endpoint label set, the method further comprises:
for each similar network endpoint label tuple in the similar network endpoint label tuple set:
making a third determination that a single similar network endpoint label remains in the similar network endpoint label tuple following the discarding of the shorter similar network endpoint label; and
assigning, based on the third determination, the single similar network endpoint label as a de-duplicated network endpoint label for the similar network endpoint label tuple,
wherein the single similar network endpoint label reflects a most descriptive similar network endpoint label.

11. The method of claim 9, wherein to merge the similar network endpoint label tuple set to obtain the de-duplicated network endpoint label set, the method further comprises:
for each similar network endpoint label tuple in the similar network endpoint label tuple set:
making a third determination that multiple similar network endpoint labels remain in the similar network endpoint label tuple following the discarding of the shorter similar network endpoint label; and
obtaining, based on the third determination and from a data source, a query result respective to each similar network endpoint label of the multiple similar network endpoint labels,
wherein the data source is an online encyclopedia, and
wherein the query result, respective to each similar network endpoint label of the multiple similar network endpoint labels,
comprises a listing of online encyclopedia articles ranked by relevance to the similar network endpoint label.

12. The method of claim 11, wherein to merge the similar network endpoint label tuple set to obtain the de-duplicated network endpoint label set, the method further comprises:
for each similar network endpoint label tuple in the similar network endpoint label tuple set:
identifying, for each similar network endpoint label of the multiple similar network endpoint labels and from the query result respective thereto, an online encyclopedia article title associated with a topmost ranked online encyclopedia article listed in the listing of online encyclopedia articles;
making a fourth determination that a first similar network endpoint label, of the multiple similar network endpoint labels, is a substring of the online encyclopedia article title for a second similar network endpoint label of the multiple similar network endpoint labels; and
based on the fourth determination:
replacing the second similar network endpoint label, of the multiple similar network endpoint labels, with the online encyclopedia article title associated therewith; and
discarding the first similar network endpoint label.

13. The method of claim 12, wherein to merge the similar network endpoint label tuple set to obtain the de-duplicated network endpoint label set, the method further comprises:
for each similar network endpoint label tuple in the similar network endpoint label tuple set:
making a fifth determination that a single similar network endpoint label remains in the similar network endpoint label tuple following the discarding of the first similar network endpoint label; and
assigning, based on the fifth determination, the single similar network endpoint label as a de-duplicated network endpoint label for the similar network endpoint label tuple,
wherein the single similar network endpoint label reflects the online encyclopedia article title.

14. The method of claim 12, wherein to merge the similar network endpoint label tuple set to obtain the de-duplicated network endpoint label set, the method further comprises:
for each similar network endpoint label tuple in the similar network endpoint label tuple set:
making a fifth determination that many similar network endpoint labels remain in the similar network endpoint label tuple following the discarding of the first similar network endpoint label;
obtaining, based on the fifth determination and from a second data source, a second query result respective to each similar network endpoint label of the many similar network endpoint labels,
wherein the second data source is a web search engine, and
wherein the second query result, respective to each similar network endpoint label of the many similar network endpoint labels, comprises a listing of webpages ranked by relevance to the similar network endpoint label;

identifying, for each similar network endpoint label of the many similar network endpoint labels and from the second query result respective thereto, a webpage title associated with a topmost ranked webpage listed in the listing of webpages; and assigning the webpage title associated with one of the many similar network endpoint labels as a de-duplicated network endpoint label for the similar network endpoint label tuple, wherein the webpage title reflects a most descriptive webpage title amongst many webpage titles identified for the many similar network endpoint labels, respectively.

15. The method of claim 1, wherein a voting algorithm is used to resolve the de-duplicated network endpoint label set to obtain the unified network endpoint label identifying the network endpoint, wherein a most voted de-duplicated network endpoint label, based on the voting algorithm, is assigned as the unified network endpoint label.

16. A system, the system comprising:

a network controller comprising a network service and a computer processor configured to, at least in part, perform a method for applying the network service to a leaf device, the method comprising:

receiving, from the leaf device, a unified label request comprising a network fingerprint extracted from and describing a network endpoint connected to the leaf device;

obtaining a plurality of network endpoint label sets inferred from the network fingerprint;

reducing the plurality of network endpoint label sets to obtain a de-duplicated network endpoint label set;

resolving the de-duplicated network endpoint label set to obtain a unified network endpoint label identifying the network endpoint;

tuning the network service based on the unified network endpoint label to obtain a network service action targeting the network endpoint; and transmitting the network service action to the leaf device, wherein the leaf device applies the network service through implementation of the network service action.

17. The system of claim 16, wherein the network service comprises a cyber-security threat detection and response service.

18. The system of claim 17, wherein implementation of the network service action comprises filtering network traffic destined to the network endpoint.

19. A non-transitory computer readable medium (CRM) comprising computer readable program code, which when executed by a computer processor, enables the computer processor to perform a method for network endpoint identification, the method comprising:

receiving a unified label request comprising a network fingerprint associated with a network endpoint, wherein the network fingerprint comprises a character string generated by a user agent operating on the network endpoint;

obtaining, from each network fingerprint parser in a plurality of network fingerprint parsers, a network endpoint label set inferred from the network fingerprint to obtain a plurality of network endpoint label sets;

reducing the plurality of network endpoint label sets to obtain a de-duplicated network endpoint label set; and resolving the de-duplicated network endpoint label set to obtain a unified network endpoint label identifying the network endpoint.

\* \* \* \* \*